(12) United States Patent
Tsurumi et al.

(10) Patent No.: US 8,659,649 B2
(45) Date of Patent: Feb. 25, 2014

(54) INFORMATION PROCESSING APPARATUS AND INFORMATION PROCESSING METHOD

(75) Inventors: Shingo Tsurumi, Saitama (JP); Takuro Noda, Tokyo (JP); Akiko Terayama, Tokyo (JP); Eijiro Mori, Tokyo (JP); Kenichi Okada, Tokyo (JP); Atsushi Koshiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 1060 days.

(21) Appl. No.: 12/698,884

(22) Filed: Feb. 2, 2010

(65) Prior Publication Data

US 2010/0208051 A1   Aug. 19, 2010

(30) Foreign Application Priority Data

Feb. 13, 2009   (JP) ............................... P2009-032027

(51) Int. Cl.
*H04N 5/253*   (2006.01)
*G06K 9/00*   (2006.01)
*G06K 9/46*   (2006.01)
*G06Q 10/00*   (2012.01)

(52) U.S. Cl.
USPC ............ 348/77; 382/189; 382/190; 705/7.32

(58) Field of Classification Search
USPC .................... 348/77; 382/189, 190; 705/7.32
See application file for complete search history.

(56) References Cited

U.S. PATENT DOCUMENTS

| | | | | |
|---|---|---|---|---|
| 5,774,591 A | * | 6/1998 | Black et al. | 382/236 |
| 6,288,704 B1 | * | 9/2001 | Flack et al. | 345/158 |
| 7,113,916 B1 | * | 9/2006 | Hill | 705/7.32 |
| 8,401,248 B1 | * | 3/2013 | Moon et al. | 382/118 |
| 2003/0032890 A1 | * | 2/2003 | Hazlett et al. | 600/546 |
| 2005/0073136 A1 | * | 4/2005 | Larsson et al. | 280/735 |
| 2006/0206371 A1 | * | 9/2006 | Hill | 705/10 |

FOREIGN PATENT DOCUMENTS

| | | | |
|---|---|---|---|
| JP | 2006-092396 | | 4/2006 |
| JP | 2007-80057 | | 3/2007 |
| JP | 2007080057 A | * | 3/2007 |
| JP | 2008-282089 | | 11/2008 |

* cited by examiner

*Primary Examiner* — Ranodhi Serrao
(74) *Attorney, Agent, or Firm* — Finnegan, Henderson, Farabow, Garrett & Dunner, LLP

(57) ABSTRACT

There is provided an information processing apparatus including an image pickup part; a display part; a position detecting part for detecting a position of a target relative to the display part; a face detecting part for detecting a face from a taken image; an attribute obtaining part for obtaining attribute information of the target; a group determining part for determining a group to which the target belongs, at least based on the attribute information of the detected target; a content determining part for determining a content to be provided to the target based on at least one of group information of the target and the attribute information of the target; and a display processing part for displaying content information of the content to be provided to the target, on the display part in a display style in accordance with the position of the target.

11 Claims, 19 Drawing Sheets

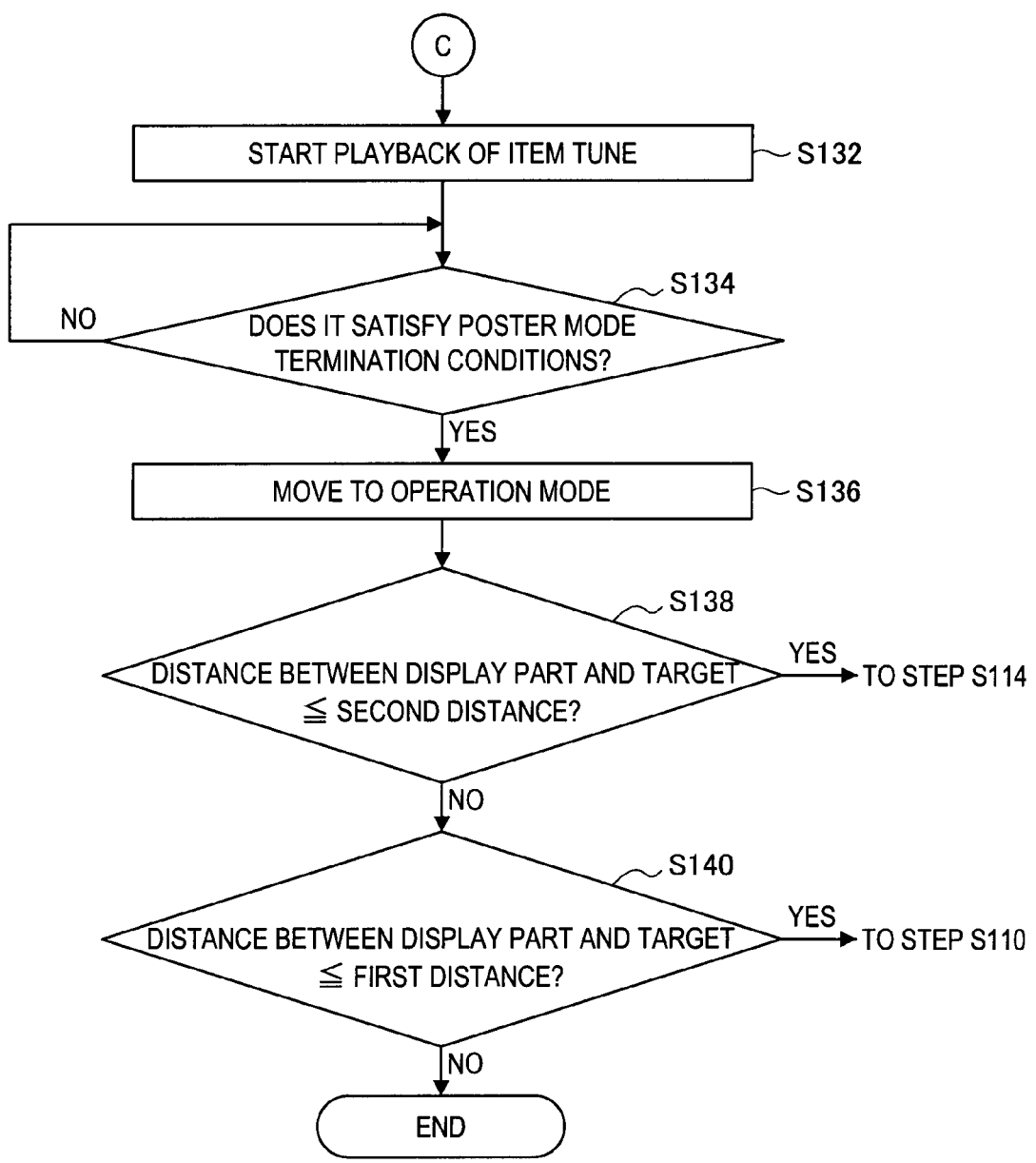

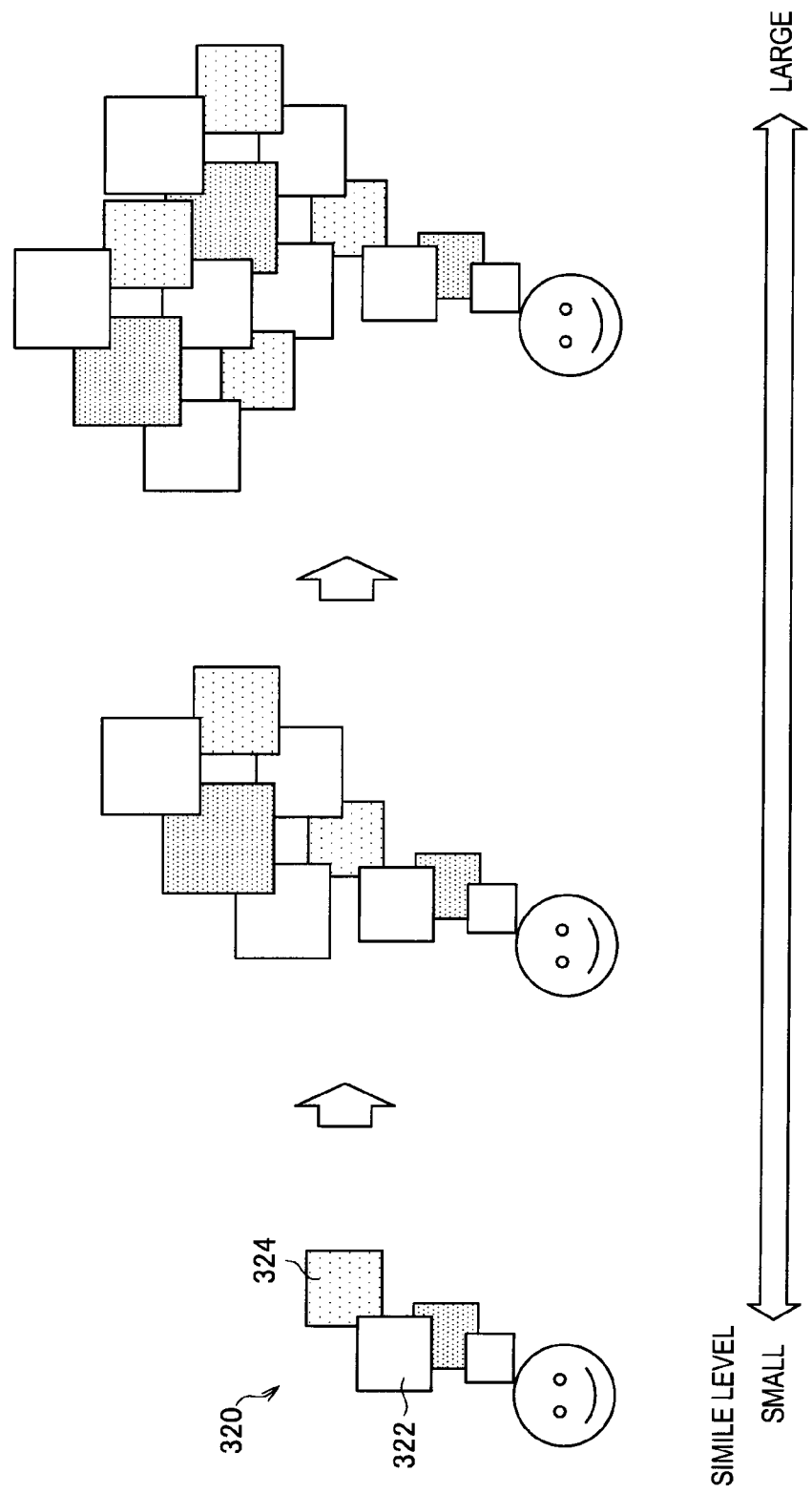

INFORMATION PROCESSING APPARATUS AND INFORMATION PROCESSING METHOD

BACKGROUND OF THE INVENTION

1. Field of the Invention

The present invention relates to an information processing apparatus and an information processing method, and more particularly, to an information processing apparatus and an information processing method for providing digital signage.

2. Description of the Related Art

Recently, with improvement in network technology and display performance, attention is given to an approach to the digital signage of displaying video and information on a display and transmitting information to a target. The digital signage has greater expressive power than existing posters, advertising displays and the like and can display contents in accordance with time and place. Use of such digital signage can impress targets greatly and propagate information directly.

In order to distribute contents to a target effectively, it is effective to obtain information about the target. For example, it is conceived that the interesting content depends on the gender and age of the target. As a method for obtaining the target information, for example, Japanese Patent Application Laid-open No. 2008-282089 discloses a method for determining facial attribute of a target such as gender, age, race and the like by analyzing facial image of the target. Besides, Japanese Patent Application Laid-open No. 2006-092396 discloses a method for determining a group type of targets from attribute information such as gender, age and the like of each target based on behaviors of the targets.

Japanese Patent Application Laid-open No. 2007-080057 discloses a system of providing a target with information or contents by obtaining attribute information of his face and using its result. For example, such a system can be applied to an entertainment device that has amusement in sequential processing of image-taking the face of a target, determining attribute of the face and displaying its result.

SUMMARY OF THE INVENTION

However, the system disclosed in JP 2007-080057 is a system that provides a content suitable for a target based on an analysis result of the target facial image and does not provide a content with good timing based on a state of the target. For example, the state of the target varies every second in accordance with the structure of the target and positional relation with the display. If the content is provided depending on such variation, the content provided can be more effective for the target.

In light of the foregoing, it is desirable to provide novel and improved information processing apparatus and information processing method capable of providing a content suitable for a target with good timing and depending on change in state of the target.

According to an embodiment of the present invention, there is provided an information processing apparatus including an image pickup part which takes an image, a display part which displays the image, a position detecting part which detects a position of a target relative to the display part, a face detecting part which detects a face from the image taken by the image pickup part, an attribute obtaining part which obtains attribute information of the target based on a detection result detected by the face detecting part, a group determining part which determines a group to which the target belongs, at least based on the attribute information of the target detected by the face detecting part, a content determining part which determines one or more contents to be provided to the target based on at least one of group information indicating the group to which the target belongs and the attribute information of the target, and a display processing part which displays content information of the content to be provided to the target, on the display part in a display style in accordance with the position of the target.

According to the present invention, the attribute information of the target of which the face is detected by the face detecting part is obtained and the position detecting part obtains the positional information of the target. Then, at least the attribute information of the target is used as a basis to determine a group to which the face-detected target belongs. The content determining part uses the group information or the attribute information of the target as a basis to determine a content suitable for the target. Then, the display processing part displays the content information on the display in a form that varies in accordance with the positional information of the target. This makes it possible to provide the content suitable for the target in accordance with change in state of the target and with good timing.

Here, when a distance between the target and the display part is a first distance or less, the display processing part may display an item set containing a plurality of pieces of the content information on the display part based on the attribute information of the target of which the face is recognized.

Moreover, when the distance between the target and the display part is a second distance or less and the second distance is less than the first distance, the group determining part may determine the group of the target face-recognized. And the content determining part determines the content to be provided to the target based on the group information.

Furthermore, when the distance between the target and the display part is a third distance or less and the third distance is less than the second distance, the display processing part may display the content information on the display part in such a manner that the target can operate the content information.

Moreover, when the distance between the target and the display part is the first distance or less and greater than the third distance, the display processing part may display the content information on the display part in such a manner that the content information is moving. When the distance between the target and the display part is the third distance or less, the display processing part may display the content information as stopped in movement.

Furthermore, the display processing part may clip a facial image of the face detected by the face detecting part and displays the facial image on the display part. The display processing part may display a face frame around the facial image and the face frame shows at leas one of the attribute information of the target and the group information. Moreover, the display processing part may display the clipped facial image as enlarged within an area between predetermined maximum size and minimum size of the facial image. Furthermore, the display processing part may display the facial image at an upper part of the display part and the content information at a lower part of the display part.

Moreover, the group determining part may determine the group to which the target belongs, based on a gender and an age class of the target obtained from the attribute information of the target detected by the face detecting part and a number of targets detected when the target comprises a plurality of targets. Here, the group determining part may determine the group to which the targets belong based on a distance between the targets detected by the position detecting part.

Furthermore, the information processing apparatus may include a mode switching part which switches between a first mode of presenting one or more pieces of content information and a second mode of presenting a content corresponding to one selected piece of the content information presented. The mode switching part determines an operation of the target from information of the position of the target detected by the position detecting part to switch from the first mode to the second mode, and the mode switching part switches from the second mode to the first mode based on preset termination conditions of the second mode.

According to another embodiment of the present invention, there is provided an information processing method including the steps of taking an image, displaying the image on a display part, detecting a position of a target relative to the display part by a position detecting part, detecting a face from the image taken, obtaining attribute information of the target based on information of the face detected, determining a group to which the target belongs, at least based on the attribute information of the target face-detected, determining a content to be provided to the target based on at least one of group information indicating the group to which the target belongs and the attribute information of the target, and displaying content information of the content to be provided to the target, on the display part in a display style in accordance with the position of the target.

According to the embodiments of the present invention described above, it is possible to provide an information processing apparatus and an information processing method capable of providing a content suitable for a target with good timing and in accordance with change in state of the target.

BRIEF DESCRIPTION OF THE DRAWINGS

FIG. 5D is a flowchart illustrating processing of a content providing function according to the exemplary embodiment;

FIG. 9 is an explanatory view illustrating an example of item display based on a smile level.

DETAILED DESCRIPTION OF THE EMBODIMENTS

Figure 1:
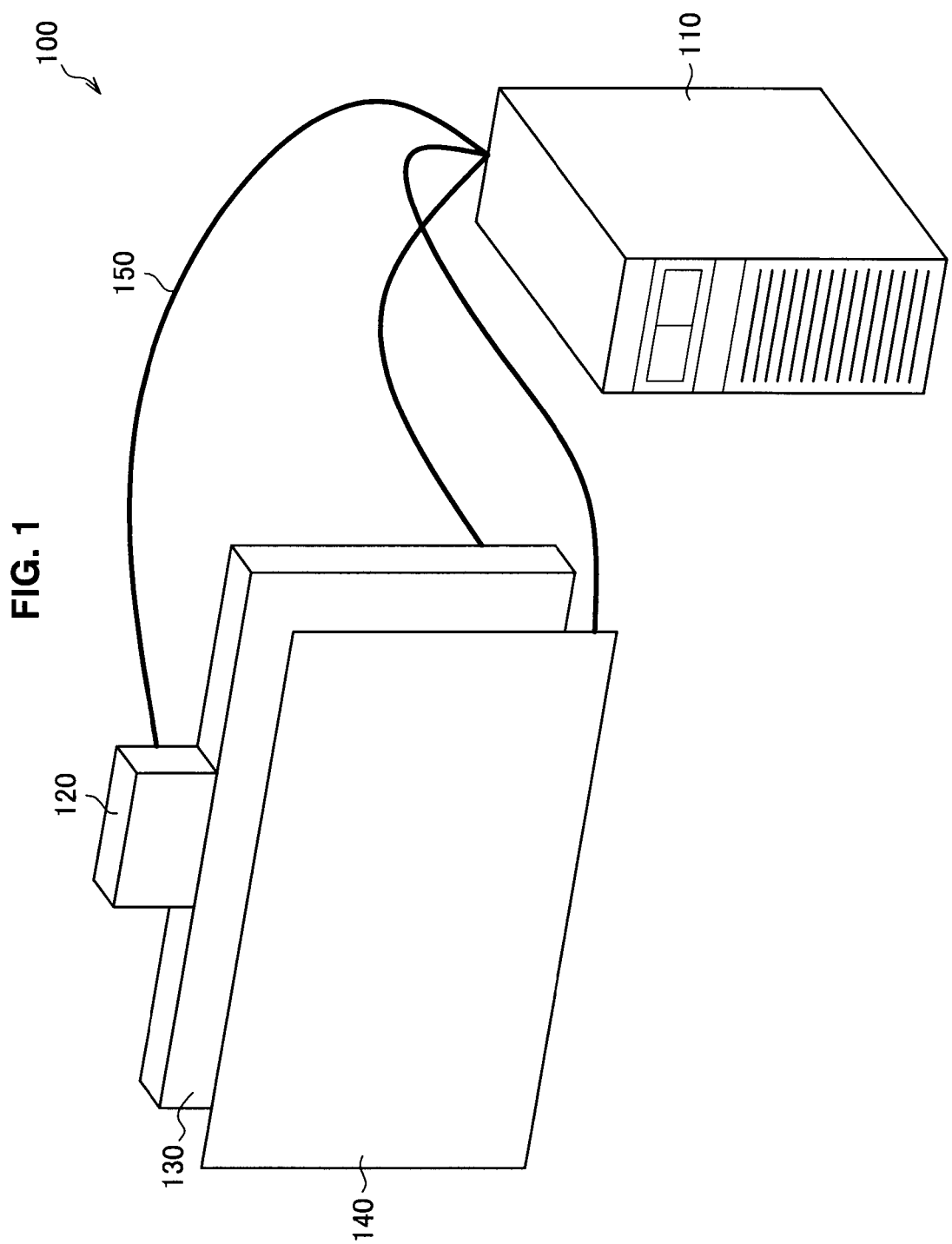
FIG. 1 is an explanatory view illustrating an outline structure of an information processing apparatus according to a first exemplary embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Structure of an information processing apparatus (Outline structure of the information processing apparatus, Hardware configuration of a controller, Functional structure of the information processing apparatus)
2. Content providing processing by the information processing apparatus (Fundamental structure of the content providing function, One processing example of the content providing function, Group attribute determining processing, Advantages, Item display based on smile level, Extension of the content providing processing)
<1. Structure of Information Processing Apparatus>
[Outline Structure of Information Processing Apparatus]

First description is made, with reference to FIG. 1, about an outline structure of the information processing apparatus 100 according to an exemplary embodiment of the present invention. In the following description, the information processing apparatus 100 is an information processing apparatus capable of providing a content to a target. Such information processing apparatus 100 has, as illustrated in FIG. 1, a controller 110, an image pickup part 120, a display part 130 and an operator 140.

The controller 110 is a functional part performing control to provide a content in accordance with state and attribute of a target and can be configured of, for example, a computer that can execute control processing. The controller 110 controls the information processing apparatus that provides a content based on operation information obtained from the operator 140 and video obtained from the image pickup part 120 and performs the image construction processing of an image displayed on the display part 130.

The image pickup part 120 is a functional part for obtaining video. For example, the image pickup part 120 has an image pickup sensor and an optical member for leading an image of an object to the image pickup sensor. The image pickup sensor is, for example, a CCD (Charge Coupled Device) image sensor, a CMOS (Complementary Metal Oxide Semiconductor) image sensor or the like.

The display part 130 provides information such as contents to a target. The display part 130 is, for example, a liquid crystal panel display or the like and it displays images generated by the controller 110.

The operator 140 is a functional part for obtaining the operation information by the target. The operator 140 is, for example, a non-contact type sensor panel. With this structure, the operator 140 can detect an operator position in the form of three dimensional coordinates (x, y, z), for example, about whether the target is in touch with or close to the operator 140. In addition, the operator 140 is arranged over the display part 130 at the surface side of the display part 130. With this arrangement, the operator 140 can provide the target with a sense of direct operation of an image displayed on the display part 130.

The controller 110, the image pickup part 120, the display part 130 and the operator 140 are connected with a cable 150, for example, so that they can communicate with each other. However, they may be connected wirelessly. Besides, the information processing apparatus 100 according to the exemplary embodiment has an output part (not shown) for outputting sound such as a speaker or the like.

Figure 2:
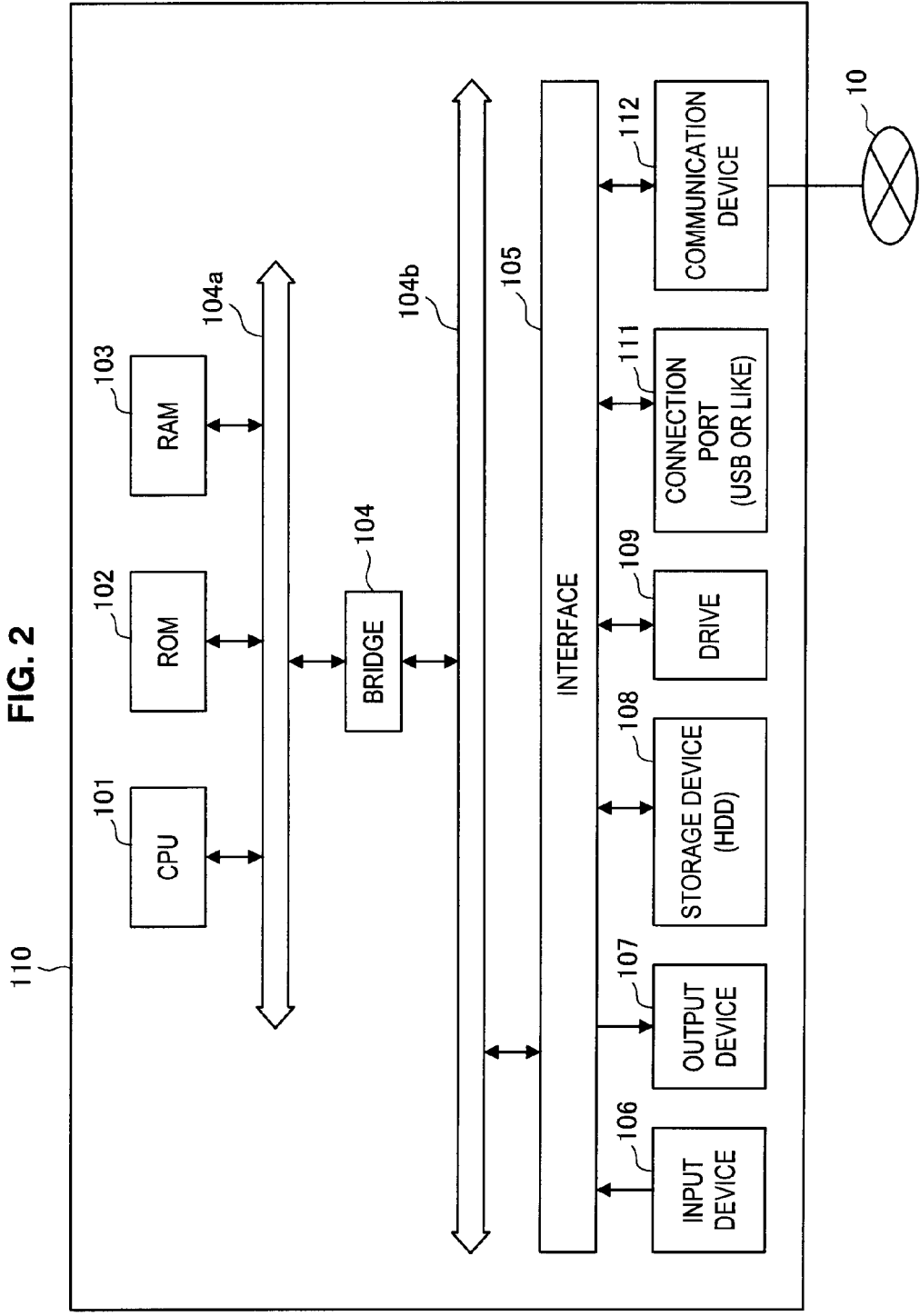
FIG. 2 is a block diagram illustrating a hardware configuration of a controller according to the exemplary embodiment.

Up to this point, the outline structure of the information processing apparatus 100 according to the present exemplary embodiment has been described. Next description is made in more detail, with reference to FIG. 2, about the hardware configuration of the controller 160 of the information processing apparatus 100 according to the exemplary embodiment. FIG. 2 is a block diagram illustrating the hardware configuration of the controller 110 according to the exemplary embodiment.

[Hardware Configuration of Controller]

The controller 110 of the present exemplary embodiment includes a CPU (Central Processing Unit) 101, a ROM (Read Only Memory) 102, a RAM (Random Access Memory) 103 and a host bus 104a. In addition, the controller 110 includes a bridge 104, an external bus 104b, an interface 105, an input device 106, an output device 107, a storage device (HDD) 108, a drive 109, a connection port 111 and a communication device 112.

The CPU 101 servers as an arithmetic processing unit and controller and controls the entire operation inside the controller 110 in accordance with various programs. In addition, the CPU 101 may be a micro processor. The ROM 102 stores programs used in the CPU 101, computing parameters and the like. The RAM 103 temporarily stores programs used in execution of the CPU 101, parameters that vary appropriately in execution of the programs and the like. These are connected to each other with the host bus 104a that is configured of a CPU bus or the like.

The host bus 104a is connected to the external bus 104b such as a PCI (peripheral Component Interconnect/Interface) bus via the bridge 104. Incidentally, the host bus 104a, the bridge 104 and the external bus 104b are not necessarily separated components, but may be configured of one bus.

The input device 106 has inputting means for a user inputting information, such as a mouse, a keyboard, a touch panel, a button, a microphone, a switch and a lever, and an input control circuit for generating an input signal based on input by the user and outputting the signal to the CPU 101. The user of the controller 110 operates the input device 106 thereby to be able to input various data and instruct processing operations to the controller 110.

The output device 107 includes a display device such as CRT (Cathode Ray Tube) display, a liquid crystal display (LCD), an OLED (Organic Light Emitting Diode) device and a lamp. Further, the output device 107 includes a sound output device such as a speaker and a headphone. This output device 107 is a device separate from the display part 130 of the information processing apparatus 100 and is used for displaying information for operation of the controller 110.

The storage device 108 is a device for storing data which is configured as one example of a memory device of the controller 110. The storage device 108 may include a storage medium, a recording device for recording data in the storage medium, a reading device for reading the data from the storage medium, a deleting device for deleting the data recorded in the storage medium and the like. The storage device 108 may have, for example, a HDD (Hard Disk Drive). This storage device 108 starts the hard disk to store various data and programs which are executed by the CPU 101.

The drive 109 is a reader/writer for the storage medium and mounted in or outside of the controller 110. The drive 109 reads information stored in a removable recording medium such as a magnetic disk, an optical disk, a magnetic optical disk, a semiconductor memory or the like and outputs the information to the RAM 103.

The connection port 111 is an interface connected to external devices and is a connection port capable of transmitting data to an external device such as a USB (Universal Serial Bus). Besides, the communication device 112 is, for example, a communication interface configured of a communication device for connecting to communication network or the like. Further, the communication device 112 may be a communication device for wireless LAN (Local Area Network), a communication device for wireless USB or a wire communication device for wire or cable communication.

Figure 3:
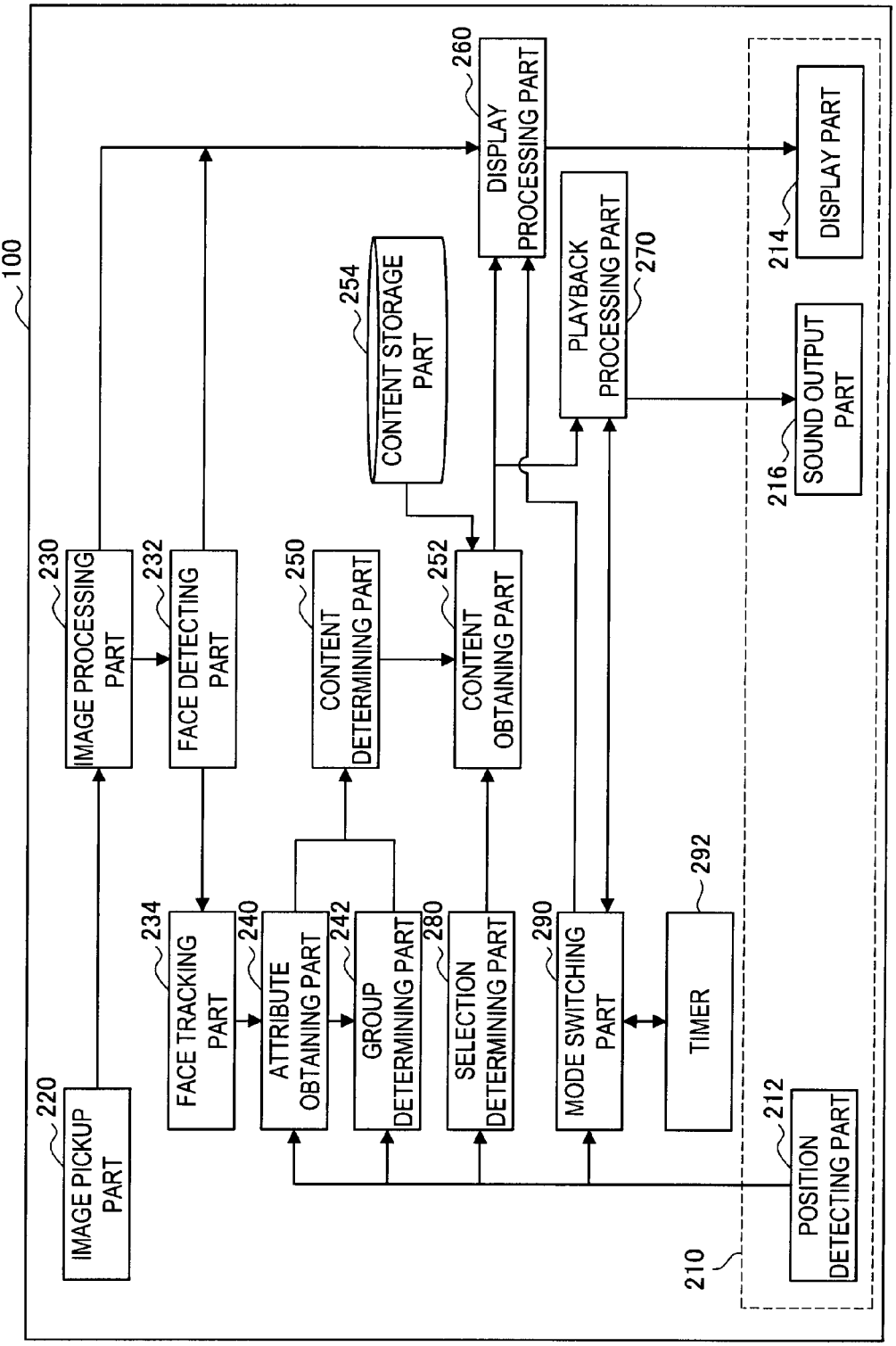
FIG. 3 is a functional block diagram illustrating the information processing apparatus according to the exemplary embodiment.
Figure 4:
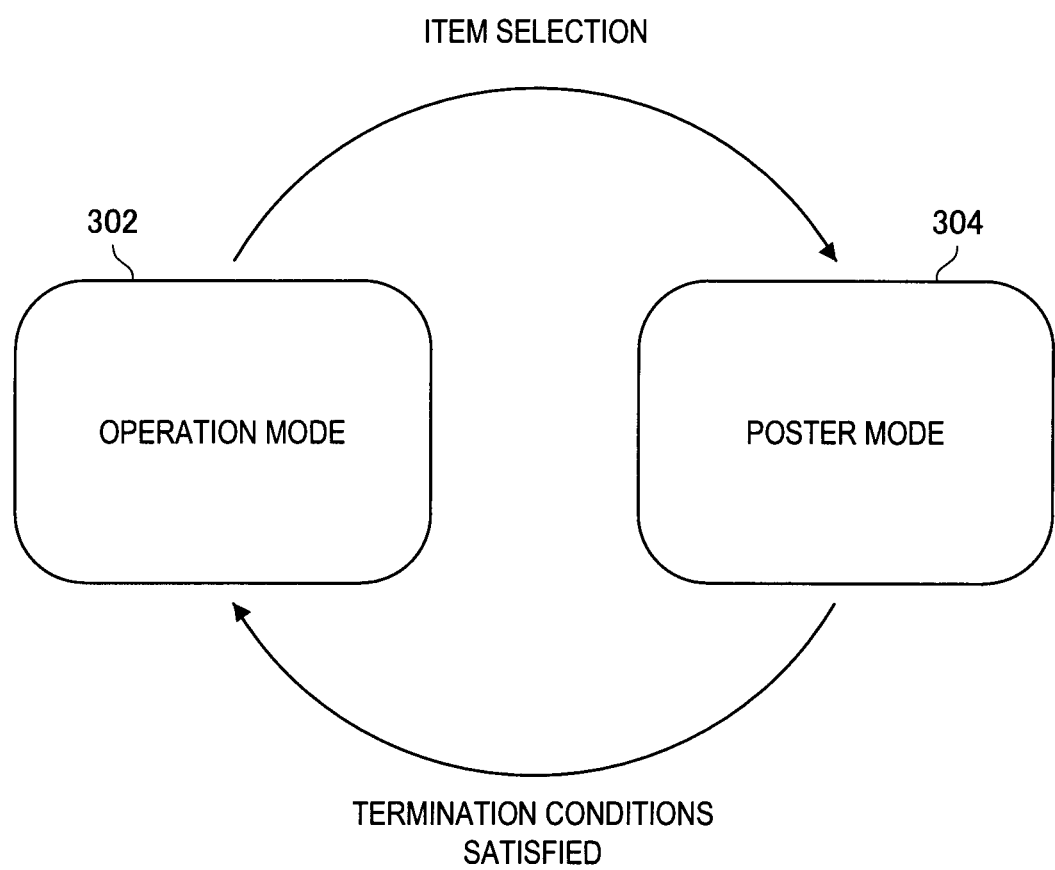
FIG. 4 is an explanatory view schematically illustrating functions of the information processing apparatus according to the exemplary embodiment.

Up to this point, the hardware configuration of the controller 100 according to the exemplary embodiment has been described. This controller 110 is used for the information processing apparatus 100 according to the exemplary embodiment to provide a content to a target in accordance with state and attribute of the target. The following description is made, with reference to FIGS. 3 and 4, about the functions of the information processing apparatus 100 according to the present exemplary embodiment. Here, FIG. 3 is a functional block diagram illustrating the information processing apparatus 100 according to the exemplary embodiment. FIG. 4 is an explanatory view schematically illustrating the functions of the information processing apparatus 100 according to the exemplary embodiment.

[Functional Structure of Image Processing Apparatus]

First description is made, with reference to FIG. 3, about the functional structure of the image processing apparatus according to the present exemplary embodiment. The information processing apparatus 100 according to the present exemplary embodiment includes functional parts of, as illustrated in FIG. 3, an input/output part 210, an image pickup part 220, an image processing part 230, an attribute obtaining part 240, a content determining part 250, a display processing part 260, a playback processing part 270, a selection determining part 280, a mode switching part 290 and the like.

The input/output part 210 is a functional part for obtaining information of a target and providing information to the target. The input/output part 210 may include a position detecting part 212, a display part 214 and a sound output part 216. The position detecting part 212 corresponds to the operator 140 of FIG. 1 and detects, as positional information of the target, a distance (z) between the operator 140 and the target and position (x, y) of an operating part in the operator 140. The position detecting part 212 outputs the detected positional information to the attribute obtaining part 240, the group determining part 242, the selection determining part 280 and the mode switching part 290. The display part 214 corresponds to the display part 130 of FIG. 1 and displays an image generated by the display processing part 260 that is a function of the controller 110. The sound output part 216 is an output device such as a speaker and is configured to output music and the like played by the playback processing part 270 that is a function of the controller 110.

The image pickup part 220 is a functional part for obtaining images and corresponds to the image pickup part 120 of FIG. 1. The image pickup part 220 has, as described above, an optical member such as a lens and an image pickup sensor. The image pickup part 220 receives an optical image of an object by the optical member and performs photoelectric conversion of the image by the image pickup sensor thereby to generate an image pickup signal. The image pickup part 220 outputs the generated image pickup signal to the image processing part 230.

The image processing part 230 is a functional part for processing an image pickup signal input from the image pickup part 220. The image processing part 230 processes the image pickup signal in such a manner that the signal becomes suitable for the following processing and outputs the image pickup signal to the display processing part 260 and the face detecting part 232.

The face detecting part 232 is a functional part for detecting a face from an image expressed by the image pickup signal. The face detecting part 232 performs face detection for the purpose of detecting a person from the image picked up by the image pickup part 220. The face detecting processing may be performed by means in related art. Once it detects a face of a person from the image, the face detecting part 232 outputs information of the detected face (facial information) to a face tracking part 234 and the display processing part 260.

The face tracking part 234 is a functional part for tracking the face based on the facial information of the person detected from the image. The face tracking part 234 outputs the facial information of the tracked face to the attribute obtaining part 240.

The attribute obtaining part 240 is a functional part for obtaining the attribute of the person detected from the image. The attribute obtaining part 240 obtains, as attribute of the person, information such as gender, age, and race. Further, the attribute obtaining part 240 can obtain additional information such as facial expression of the person such as smiling, with or without glasses, and the like. The attribute determining part 240 outputs the obtained attribute information to the group determining part 242 and the content determining part 250.

The group determining part 242 is a functional part for grouping persons detected from images. The group determining part 242 classifies a person into a given group based on the attribute information of the person. The groups include, for example, couple, family, friends and the like. The group determining part 242 determines a group to which the person in the image belongs and outputs the determination result to the content determining part 250 as group information.

The content determining part 250 is a functional part for determining a content to provide to the target. The content determining part 250 determines a person to be a target and determines a content to be provided to the target based on attribute information and group information of the person. The detail processing of determining the content will be described below. Once it determines the content to be provided, the content determining part 250 outputs an instruction to obtain the content to the content obtaining part 252.

The content obtaining part 252 is a functional part for obtaining the content information from the content storage part 254. The content obtaining part 252 receives the instruction to obtain the content from the content determining part 250 and the selection determining part 280 and obtains the content and information about the content from the content storage part 254. The content obtaining part 252 outputs the obtained information to the display processing part 260 and the playback processing part 270.

The content storage part 254 is a storage part for storing a content that can be provided by the information processing apparatus 100. The content storage part 254 stores various contents including music information, video information such as movie and drama, biblio information such as book and magazine and the like. The content storage part 254 can be connected to an external content providing server via an interface (not illustrated) and network and update stored contents.

The display processing part 260 is a functional part for generating an image displayed on the display part 214. The display processing part 260 uses information input from the image processing part 230, the face detecting part 232 and the content obtaining part 252 as a basis to generate the image to display. The display processing part 260 outputs the generated image to the display part 214.

The playback processing part 270 is a functional part for generating sound which is to be output from the sound output part 216. The playback processing part 270 processes the sound of the content input from the content obtaining part 252 to be replayed and outputs it to the sound output part 216.

The selection determining part 280 is a processing part for determining the content selected by the target. The selection determining part 280 uses the positional information of the target obtained by the position detecting part 212 as a basis to determine the content selected by the target out of contents displayed on the display part 214. Then, the selection determining part 280 outputs a determination result to the content obtaining part 252.

The mode switching part 290 is a functional part for switching processing modes in the information processing apparatus 100. The mode switching part 290 controls switching of the processing modes in the information processing apparatus 100 based on predetermined conditions. In this exemplary embodiment, the mode switching part 290 uses the positional information input from the position detecting part 212, playback information of the content input from the playback processing part 270, processing time of the timer 292 and the like as a basis to determine switching of the processing modes. Then, the mode switching part 290 uses a determination result as a basis to give instructions to the display processing part 260 and the playback processing part 270.

The timer 292 is a functional part for counting the time. In the present exemplary embodiment, the timer 292 counts the time as information for determining switching of the processing modes by the mode switching part 290. For example, the timer 292 counts a time elapsed after the predetermined processing in a predetermined functional part is started and outputs the time to the mode switching part 290.

<2. Content Providing Processing by Information Processing Apparatus>
[Fundamental Structure of Content Providing Function]

The functional structure of the information processing apparatus 100 according to the present exemplary embodiment has been described above. Such an information processing apparatus 100 according to the present exemplary embodiment has, as illustrated in FIG. 4, two processing modes, that is, an operation mode 302 for detecting a target to search for a content to be provided and a poster mode 304 for providing the content. The operation mode 302 is a mode for detecting a target to provide a content from an image taken by the image pickup part 220 and providing the content while changing a presentation state of the content based on the positional information of the target. On the other hand, the poster mode 304 is a mode for providing the content selected by the target.

The information processing apparatus 100 executes the operation mode 302 as a basic mode and when the target selects the content (item) in the operation mode 302, the information processing apparatus 100 switches from the operation mode 302 to the poster mode 304. When the information processing apparatus 100 executes the poster mode 304, it determines whether the poster mode 304 is terminated. When it determines termination conditions are satisfied, it returns to the operation mode 302. The termination condition of the poster mode 304 includes, for example, whether the target is in touch with the operator 140, whether a predetermined time has elapsed after the mode is switched to the poster mode 304, whether the played content is finished and the like. While the termination conditions are not satisfied, the information processing apparatus 100 continues to execute the poster mode 304.

Figure 5A:
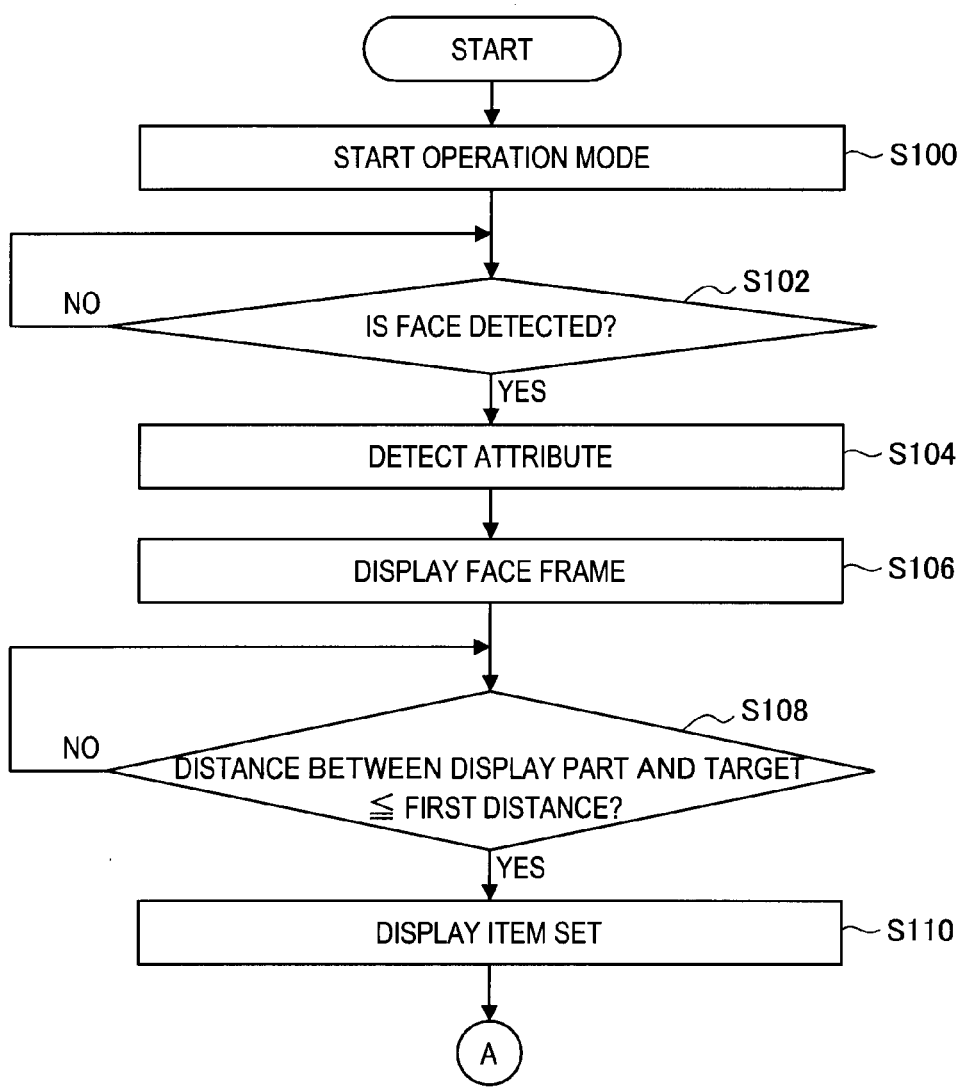
FIG. 5A is a flowchart illustrating processing of a content providing function according to the exemplary embodiment.
Figure 5B:
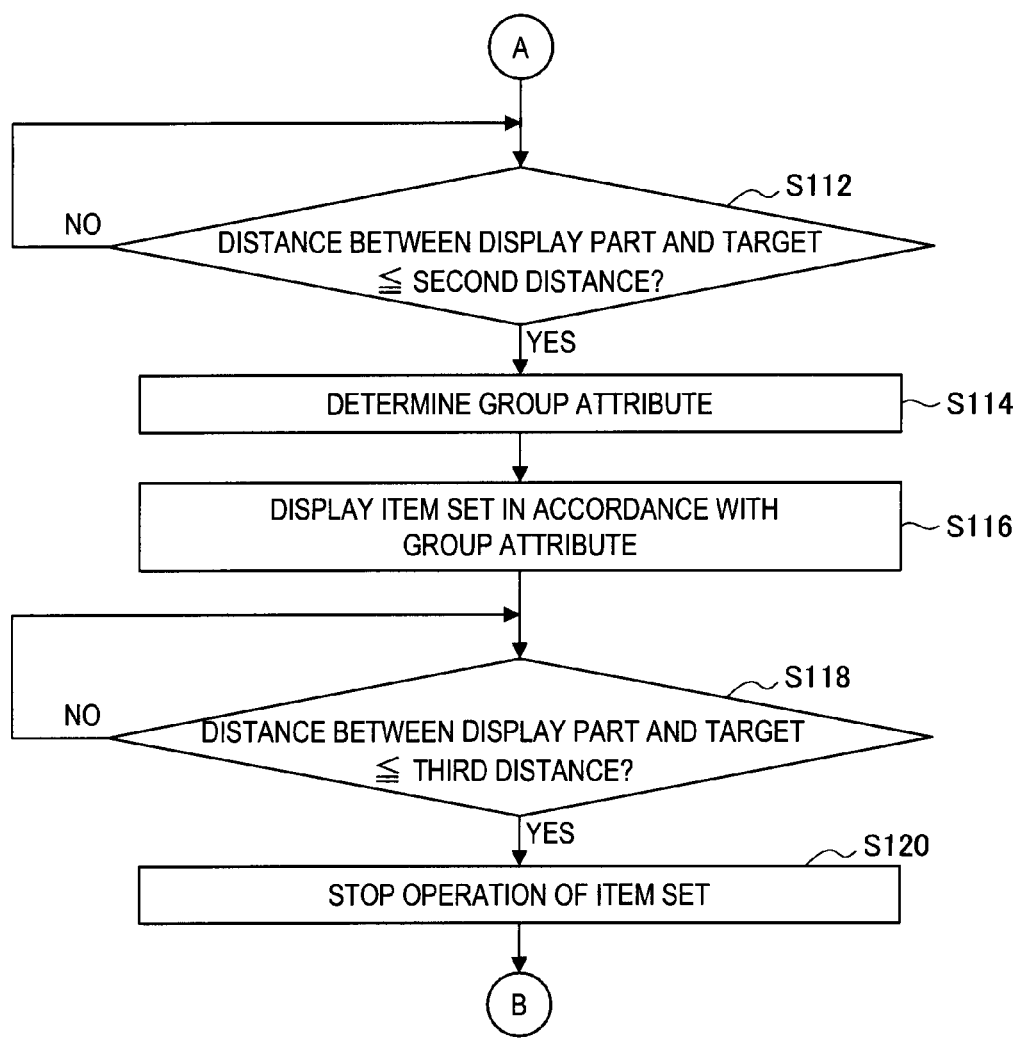
FIG. 5B is a flowchart illustrating processing of a content providing function according to the exemplary embodiment.
Figure 5C:
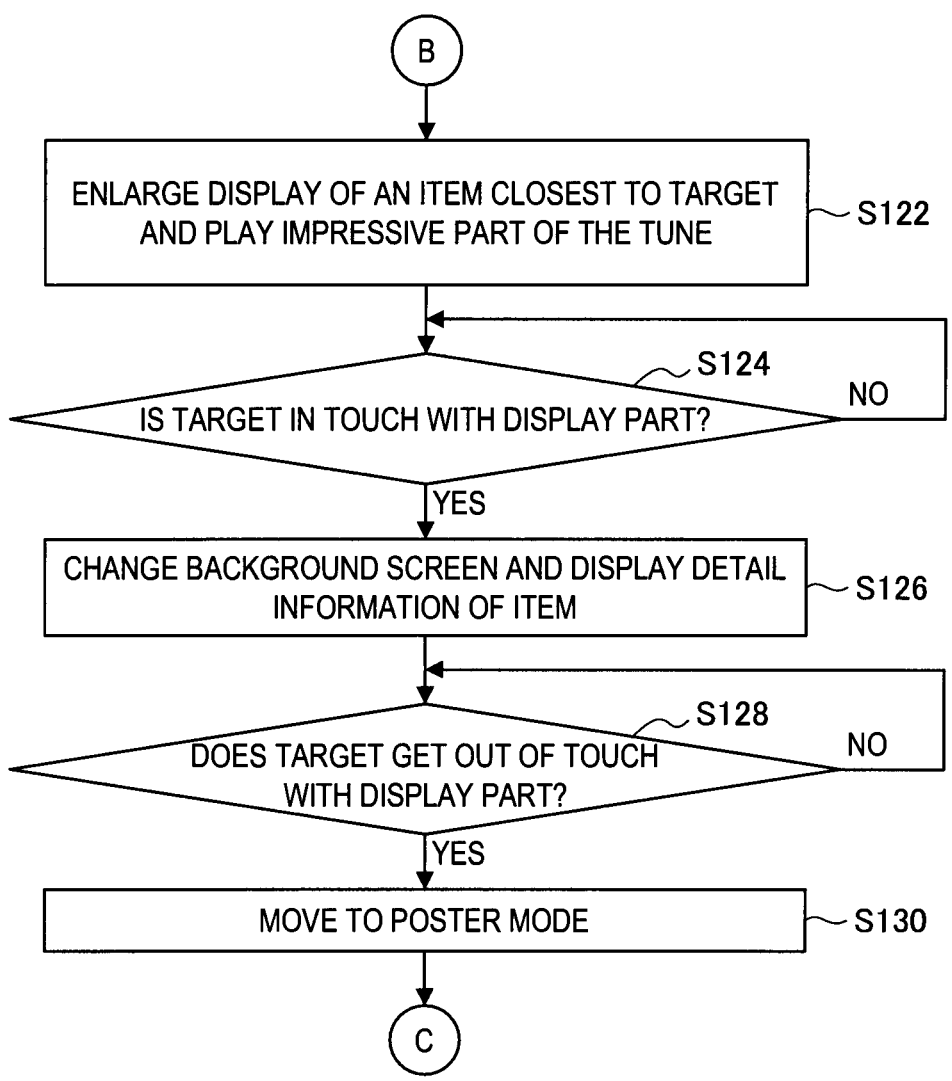
FIG. 5C is a flowchart illustrating processing of a content providing function according to the exemplary embodiment.
Figure 6:
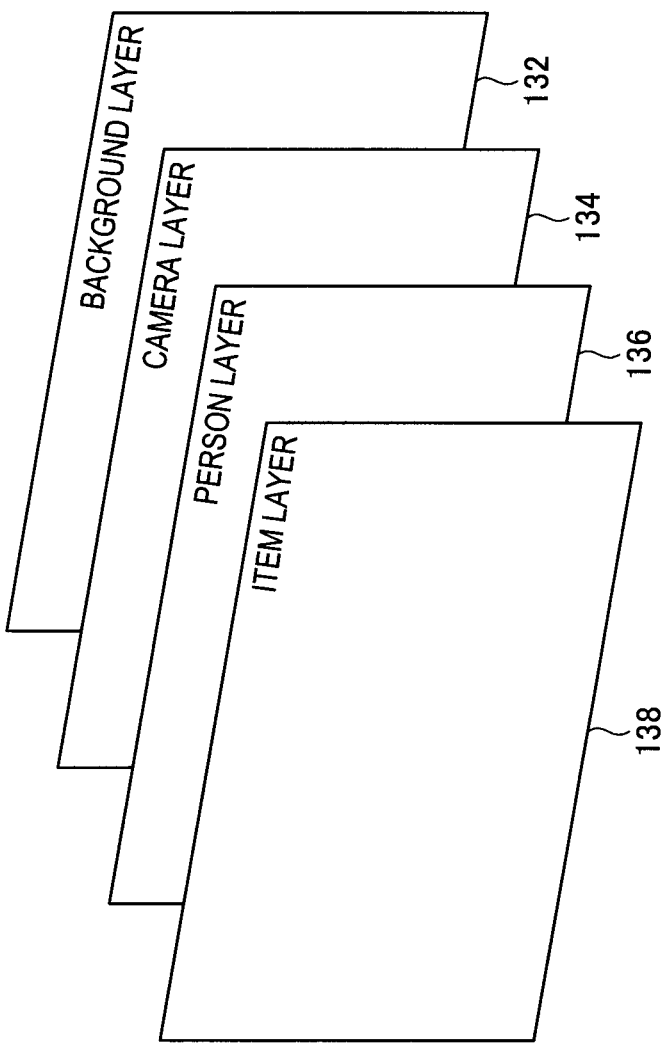
FIG. 6 is an explanatory view illustrating a screen structure of an image displayed on a display part.
Figure 7:
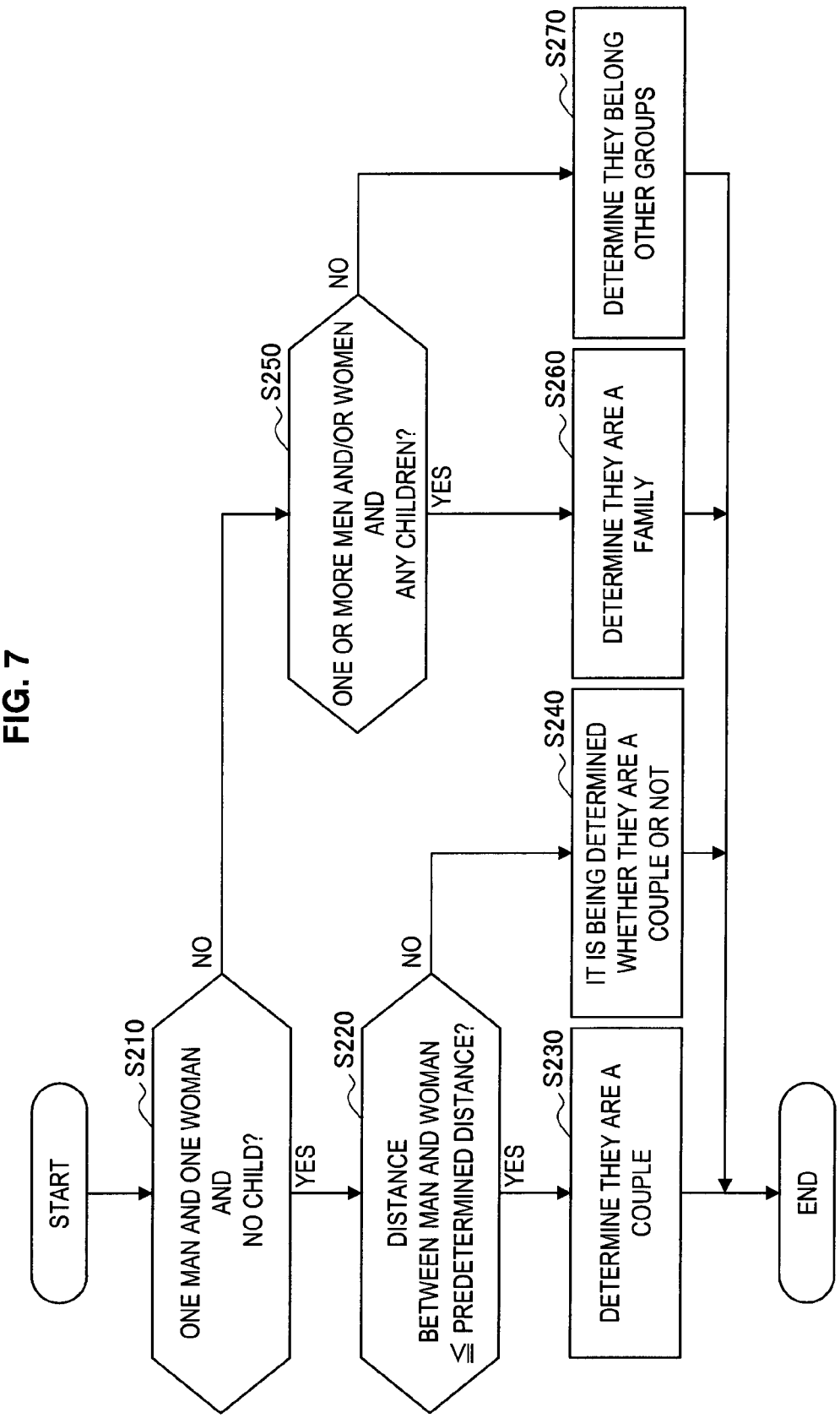
FIG. 7 is a flowchart illustrating group attribute determining processing.

Next description is made in detail, with reference to FIGS. 5A to 8H, about an example of the content providing function by the information processing apparatus 100 according to the present exemplary embodiment. FIGS. 5A to 5D are flowcharts illustrating processing of the content providing function according to the present exemplary embodiment. FIG. 6 is an explanatory view illustrating the screen structure of the image displayed on the display part 130. FIG. 7 is a flowchart illustrating the group attribute determining processing. FIGS. 8A to 8H are flowcharts each illustrating one processing example of the content providing function according to the present exemplary embodiment. In FIGS. 8A to 8H, the upper views illustrate the distance between the display part 130 and the target seen from the side and the lower views illustrate the image displayed on the display part 130. Besides, the "content" is explained as an "item" below.

[One Processing Example of Content Providing Function]

The information processing apparatus 100 according to the present exemplary embodiment first starts the operation mode 302 as described above (S100). In the operation mode 302, the current image taken by the image pickup part 120 (image pickup part 220) is displayed on the display part 130 (display part 214).

The image displayed on the display part 130 has four layers as illustrated in FIG. 6. They are a background layer 132, a camera layer 134, a person layer 136 and an item layer 138. In the background layer 132, information about the currently selected item is displayed. In the camera layer 134, the current image taken by the image pickup part 120 is displayed. In the present exemplary embodiment, the image taken by the image pickup part 120 is flipped horizontally before the image is subjected to permeabilization, and then, the image is displayed on the camera layer 134. In the person layer 136, a person detected from the image taken by the image pickup part 120 is displayed. Then, in the item layer 138, information of the item to be provided to the target such as contents is displayed.

When the operation mode 302 is started, the image of the background layer 132, in which the current image taken by the image pickup part 120 is displayed, is only displayed. Thus, as the image of the image pickup part 120 is displayed on the display part 130, it is possible to attract the target's interest and there is such an effect that the display part 130 recognizes the target.

Then, the face detecting part 232 detects a face of the person from the image taken by the image pickup part 120 (S102). Until the face detecting part 232 detects the face of the person from the image, the processing is repeated. At this point, for example, as illustrated in the lower view of FIG. 8A, the current image taken by the image pickup part 120 is flipped horizontally and subjected to permeabilization, and then displayed on the display part 130. This display state is the same as that when the operation mode 302 is started. At this time, the face of the person is not detected and as illustrated in the upper view of FIG. 8A, the target often does not exist in an area in which the position detecting part 212 can detect the target.

Then, when the face of the person is detected from the image by the face detecting part 232 at S102, the attribute information of the recognized person is detected (S104). At this time, the face tracking part 234 performs tracking processing of the face detected by the face detecting part 232. By tracking the detected face by the face tracking part 234 and obtaining the facial information with predetermined timing, average facial information can be obtained. This can prevent improper processing with use of facial information that is temporarily detected due to viewpoint. At S104, the attribute obtaining part 240 obtains information as facial information of the detected person such as gender, age, and race. In the present exemplary embodiment, for example, person attribute information, that is, man (adult male), woman (adult female) or child, is obtained from the facial information of the person. The person attribute information can represent more detail difference in age, race and the like based on types of the facial information and application purposes.

The person attribute information obtained at S104 is used as a basis to represent a face frame of the recognized person (S106). At S106, a facial image of the recognized person from the pickup image is clipped and displayed over around the corresponding person displayed in the background layer 132. For example, the clipped facial image is cut into a circle shape with an area about 1.6 times larger of the detected face is clipped and there is a face frame indicated by a double line around the facial image. In the face frame, an inner frame is displayed in color based on the personal attribute information. For example, the frame is displayed in black for men, in white for women and in yellow for children. On the other hand, an outer frame of the face frame is displayed in color based on a group to which a person belongs. The group attribute will be described in detail below. The size and shape of the clipped facial image are not limited to those in the above-described example and may be changed appropriately depending on the size or shape of the screen, personal attribute information or the like.

Figure 8A:
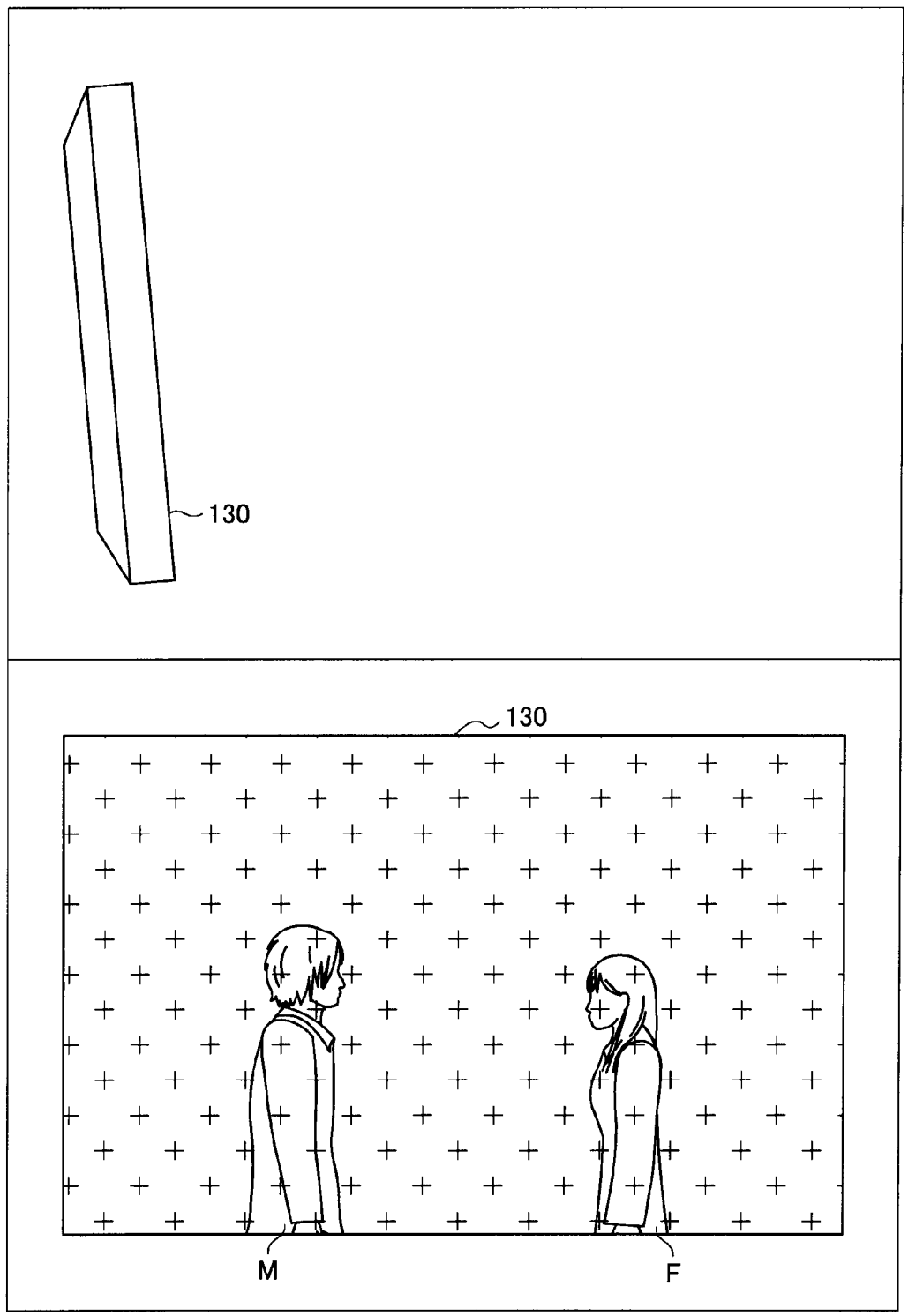
FIG. 8A is an explanatory view illustrating an example of processing of the content providing function according to the exemplary embodiment.
Figure 8B:
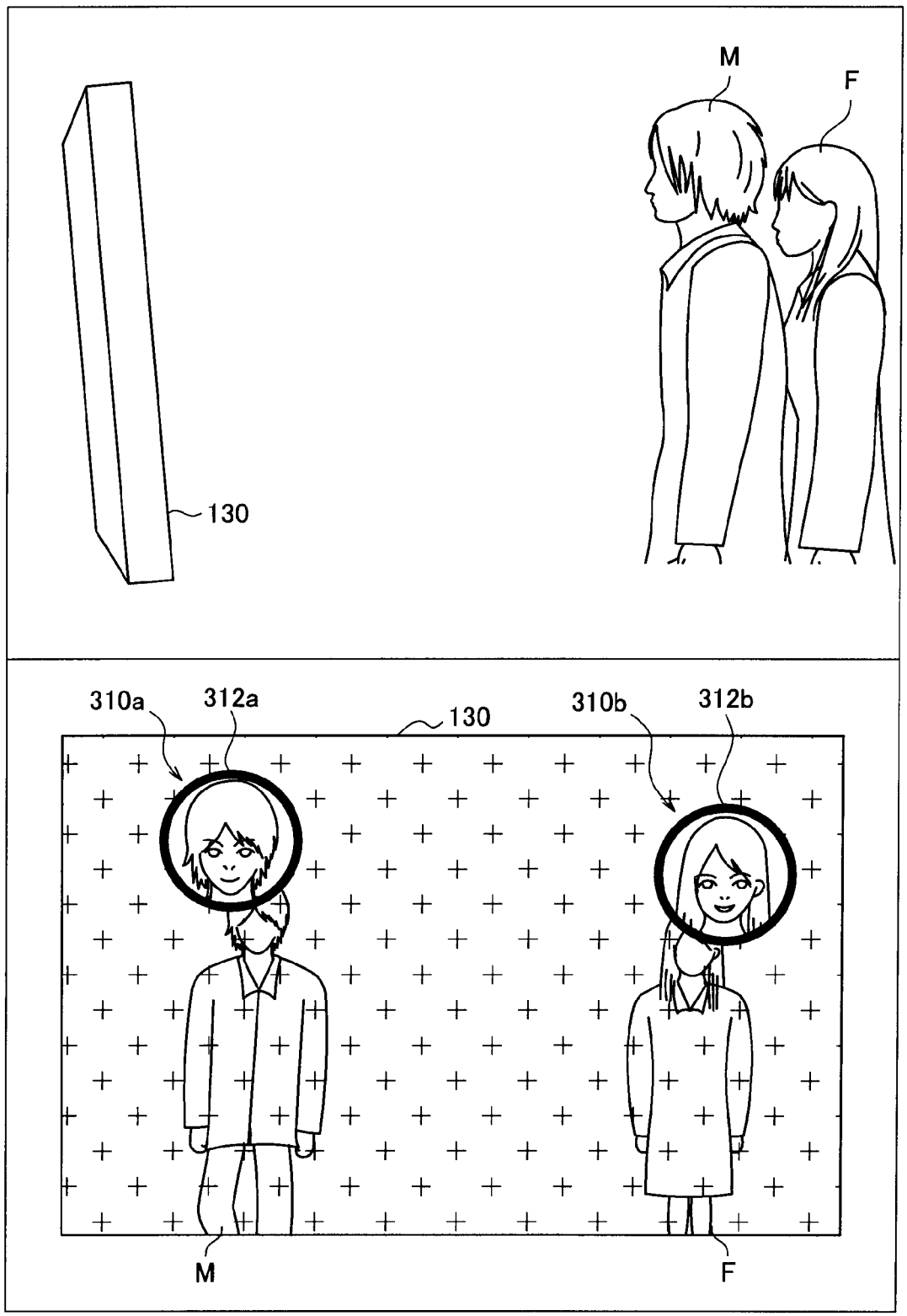
FIG. 8B is an explanatory view illustrating an example of processing of the content providing function according to the exemplary embodiment.

For example, as illustrated in the upper view of FIG. 8B, it is assumed that the man M and the woman F get close to the display part 130. At this time, when the faces of them are detected from the image taken by the image pickup part 120, as illustrated in the lower view of FIG. 8B, the facial images 310a, 310b of the man M and the woman F are clipped and the clipped images are displayed around their heads. Then, the inner frame 312a of the facial image 310a of the man M is displayed, for example, in black and the inner frame of the facial image 310b of the woman F is displayed in white. Here, as the group attribute of them is not determined yet, the outer frames are not displayed. These facial images 310a and 310b are displayed on the person layer 134.

Further, at the lower side of each facial image, an item set is displayed (which is described below). Therefore, the facial image is displayed within an area of about one third of the upper part of the screen. The display position of the item set is not limited to the lower side of the facial image, but the item set may be displayed at the upper side of the facial image or around the facial image. In these cases, the item set is preferably displayed in such a manner that the target can easily operate to select an item. Furthermore, as to the size of the facial image, its maximum size and minimum size may be set so as to prevent the facial image from becoming too large or small. The size of the facial image may be changed appropriately depending on the distance so that the target can easily recognize it visually.

Then, it is determined whether the distance between the target and the display part 130 is the first distance or less (S108). That is, at S108, it is determined whether the target gets close to the display part 130. The distance between the target and the display part 130 can be detected with use of an analysis result of the image taken by the image pickup part 120 or position detecting part 212. In this exemplary embodiment, while the distance may not be detected by the position detecting part 212, the size of the face detected in face detection is used to obtain an approximate value of the distance and use it for simple processing. Then, as to face size, the same thresholds may be used to determine the distance irrespective of the target's age, but the accuracy in distance calculation can be improved if the face size depending on age is taken into account. Besides, in order to obtain a more accurate distance, the distance from the target may be measured by a plurality of image pickup parts.

Figure 8C:
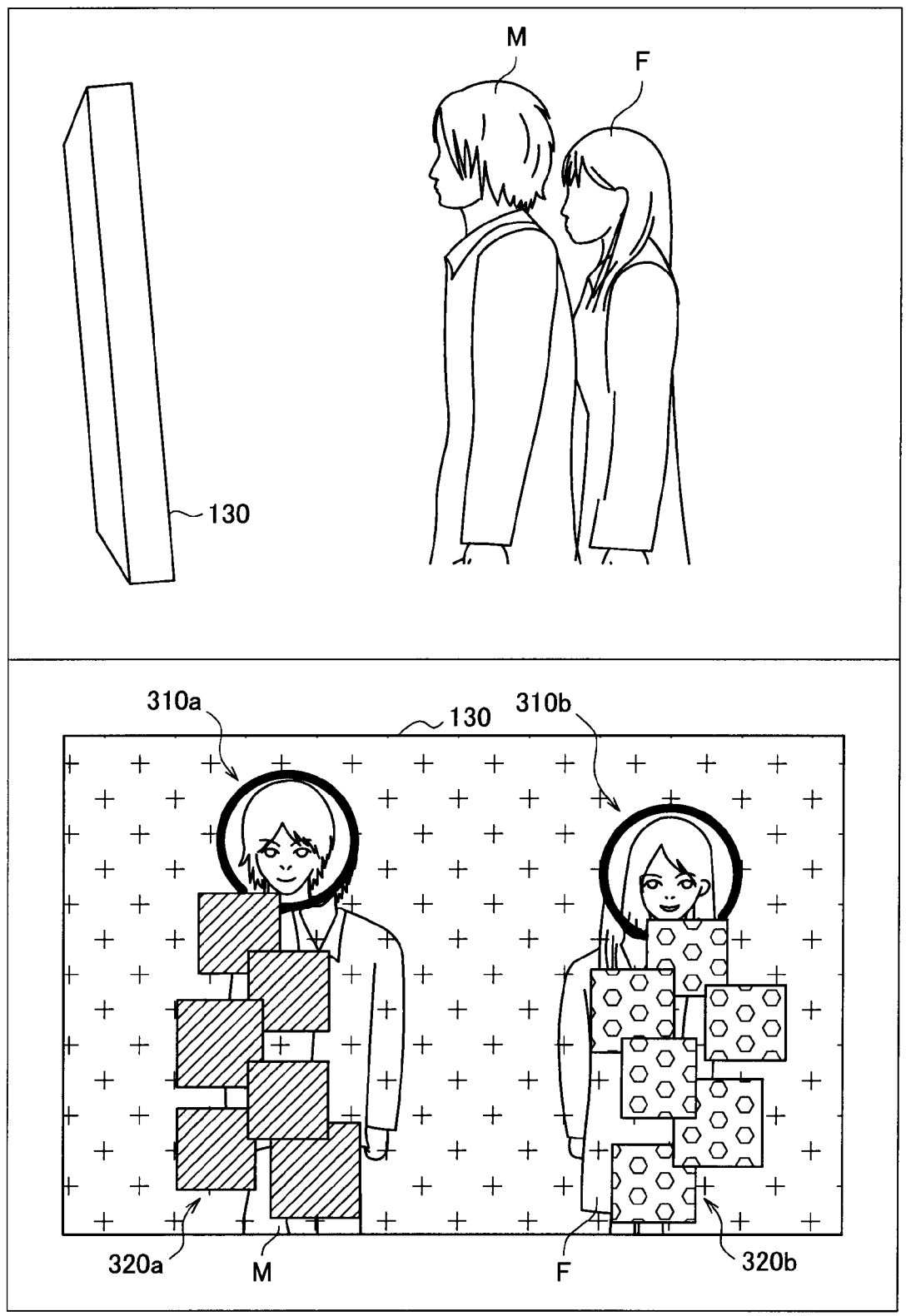
FIG. 8C is an explanatory view illustrating an example of processing of the content providing function according to the exemplary embodiment.

While the distance between the target and the display part 130 is greater than the first distance, the image as illustrated in FIG. 8B is displayed on the display part 130. On the other hand, when the distance between the target and the display part 130 is the first distance or less, the item set is displayed on the display part 130 (S110). As the target has got close to the display part 130, the item set is displayed in accordance with the person attribute information of the target to attract the target's interest. The item set contains images of a plurality of items recommended for each individual or group. For example, it is assumed that an item is music. Then, as illustrated in FIG. 8C, the item sets 320*a* and 320*b* are displayed at the respective lower sides of the facial images 310*a* and 310*b* of the man M and woman F. The item set 320*a* contains CD jackets of music recommended for the man M and the item set 320*b* contains CD jackets of music recommended for the woman F.

The items of the item sets 320*a* and 320*b* may be displayed as oscillating in accordance with the positions of the respective facial images 310*a* and 310*b*. As the items are displayed actively moving within a predetermined area, floating state of each item can be expressed. Such display method of the item set can attract the target's interest more. Further, one frame may be displayed around one item set like those of the facial images 310*a* and 310*b*. In this case, if the frame is displayed in the same color as that of the face frame, it becomes possible to easily know for which target the displayed items are recommended.

Next, as illustrated in FIG. 5B, it is determined whether the distance between the target and the display part 130 is the second distance or less (S112). The second distance is shorter than the first distance and the target needs to be closer to the display part 130 in order to be in touch with the display part 130. The distance is such a distance that the information displayed on the display part 130 is recognizable. Until the distance between the target and the display part 130 becomes the second distance or less, the image as illustrated in FIG. 8C is displayed on the display part 130.

On the other hand, when the distance between the target and the display part 130 is the second distance or less, the group determining part 242 executes the group attribute determining processing (S114). The group attribute determining processing can be performed, for example, by the method illustrated in FIG. 7.

[Group Attribute Determining Processing]

In the group attribute determining processing illustrated in FIG. 7, targets are classified into three groups of couple, family and others and one couple determining group as one mid state in which they are being determined to be a couple or not. In such group attribute determining processing, it is first determined whether faces of one man and one woman are detected and no child is detected (S210). At S210, when it is determined that faces of one man and one woman are detected and no child is detected, a distance between the man and the woman is determined (S220). When the distance between the man and the woman is a predetermined distance or less, they are determined to be a "couple" (S230). On the other hand, when the distance between the man and the woman is greater than the predetermined distance, they are determined to belong to the "couple determining" group (S240).

Transition between the "couple" state and the "couple determining" state can be made as may be necessary, depending on the distance between the man and the woman. That is, when the distance between the man and the woman becomes shorter from the "couple determining" state, they are determined to be a "couple". On the other hand, when the distance between the man and the woman becomes longer as compared with the "couple" state, they are determined to belong to the "couple determining" state. Incidentally, the determining processing of S220 may be made based on not only the distance between the man and the woman but also the smile level of a person obtainable from the facial information. For example, the man and the woman may be determined to be a couple when the distance between the man and the woman is the predetermined distance or less and their smile levels are a predetermined value or more.

Returning to the flowchart of FIG. 7, when the state determined at S210 is not that the faces of the man and the woman are detected and no child is detected, then, it is determined whether one or more men or women are face-detected and there exist any children (S250). At S250, it is determined whether they are a group including at least one adult (man or woman) and at least one child. When it is determined at S250 whether at least one adult is face-detected and there exists at least one child, the group determining part 242 determines that they are a "family" (S260). On the other hand, the state determined at S250 is not that at least one adult is face-detected and there exists at least one child, the group determining part 242 determines that they belong to "other groups" (S270). The other groups include, for example, a friend group.

Returning to FIG. 5B, when the group attribute is determined at S114, the item set depending on the group attribute is displayed (S116). For example, when they are determined to be a "couple" at S114, the item set containing items recommended for couple is displayed, and when they are determined to be a "family", the item set containing items recommended for families is displayed. Here, for the item set displayed on the display part 130, the item set based on the group attribute can be given priority over the item set based on the personal attribute information.

Figure 8D:
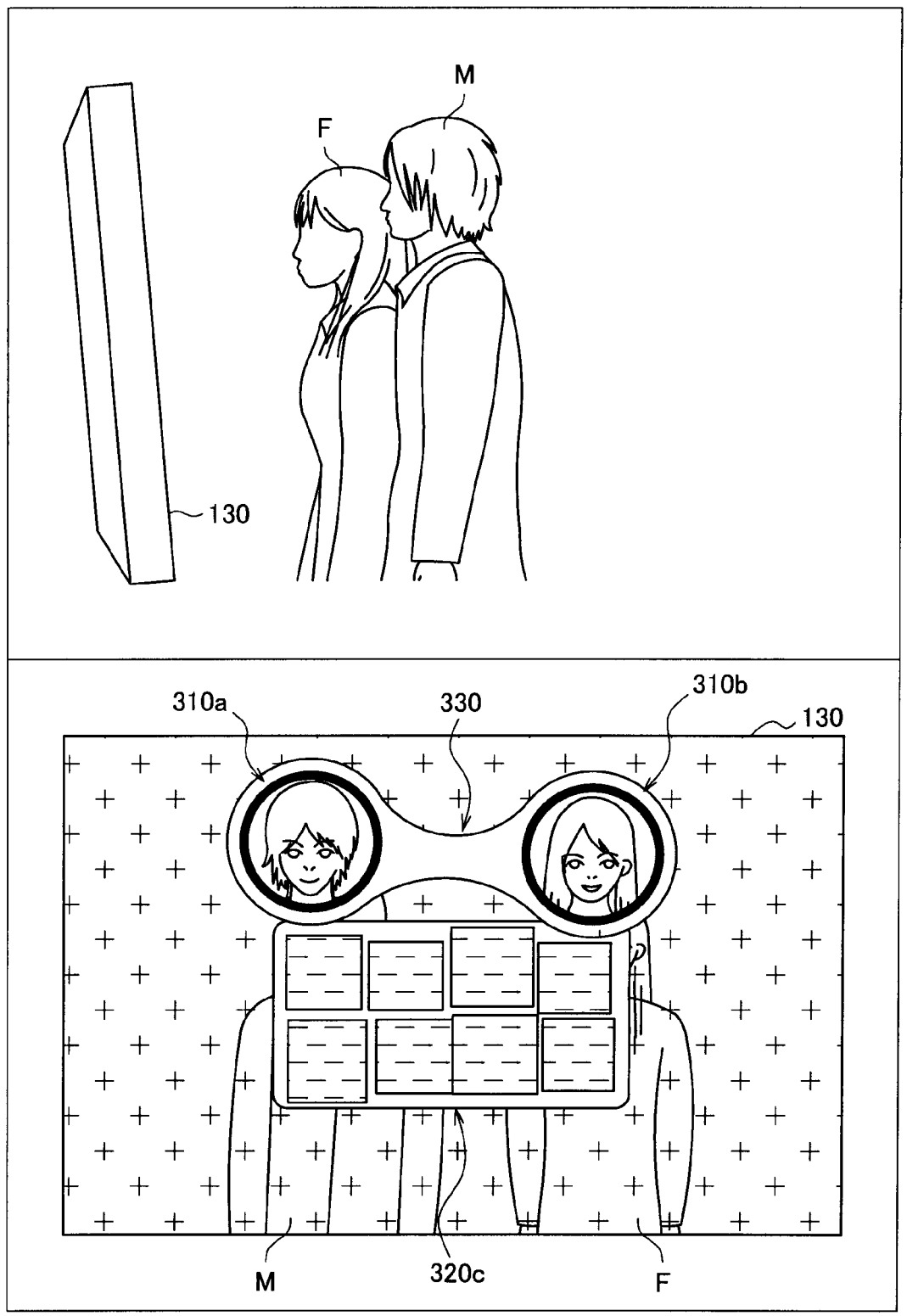
FIG. 8D is an explanatory view illustrating an example of processing of the content providing function according to the exemplary embodiment.

For example, the state where one man and one woman are face-detected and there is no child is determined to be a "couple" state and, as illustrated in the lower view of FIG. 8D, the item set 320*c* containing items recommended for couples are displayed. At this time, a group frame 330 may be displayed which encircles facial images of persons belonging to the same group. This group frame 330 corresponds to the above-mentioned outer frame of the face frame. Like the face frame, the group frame 330 may be changed in color depending on the group attribute so as to clearly show a group to which a target belongs.

In addition, when one man and one woman are face-detected, the group frame 330 in the "couple" state encircles face frames 310a and 310b of the man and woman, respectively. On the other hand, in the "couple determining" state, the outer frames of the face frames 310a and 310b of the man and the woman may be displayed in such a shape that they are drawn toward each other. Then, when the man and the woman get close to each other and they are determined to be the "couple" state from the "couple determining" state, the outer frames of the face frames 310a and 310b of the man and woman may be displayed in such a shape that they are sticking together.

Figure 8E:
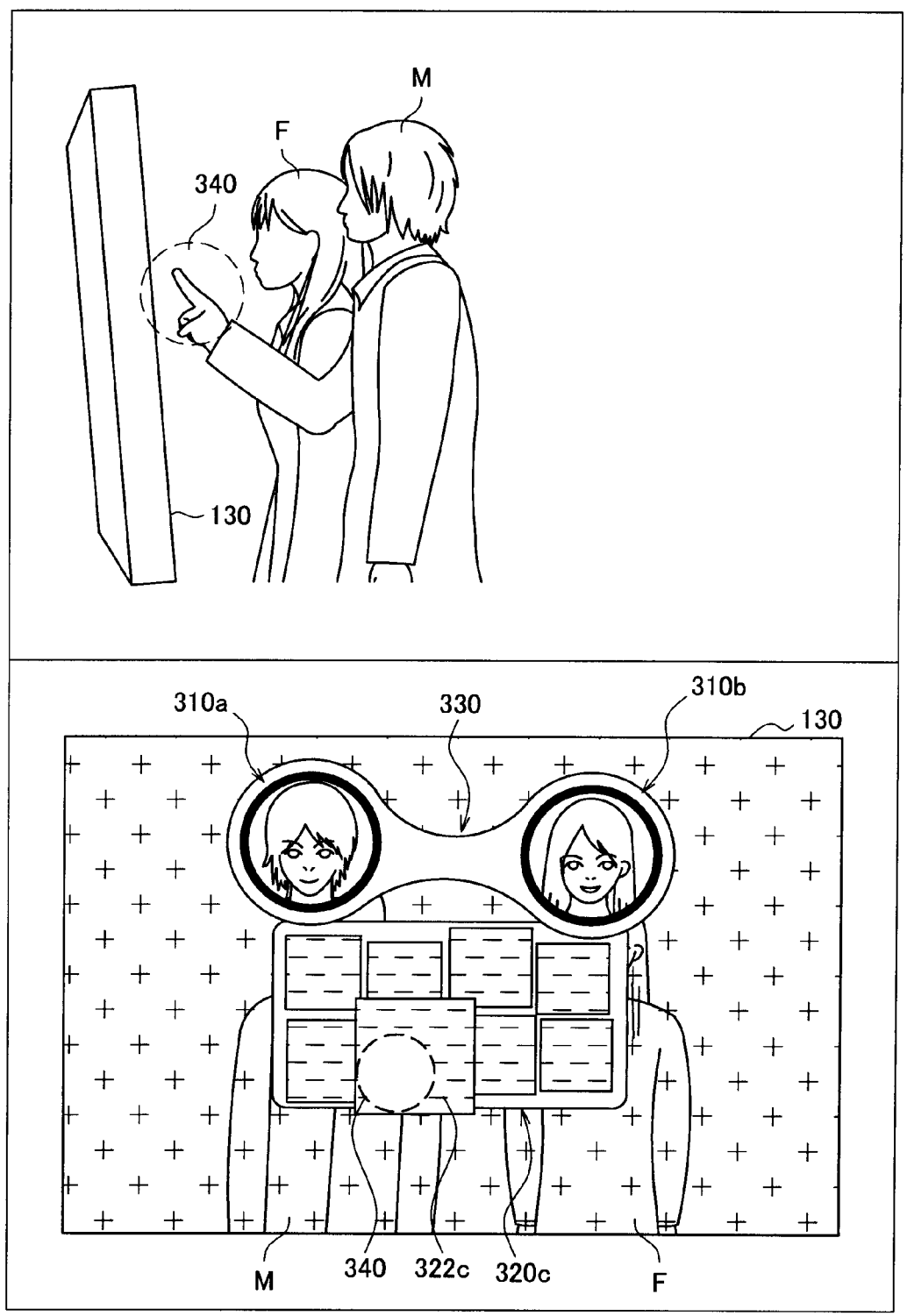
FIG. 8E is an explanatory view illustrating an example of processing of the content providing function according to the exemplary embodiment.

Then, it is determined whether the distance between the target and the display part 130 is a third distance or less (S118). Here, the third distance can be a distance by which the target can be in touch with the display part 130. While the distance between the target and the display part 130 is greater than the third distance, the image as illustrated in FIG. 8D is displayed on the display part 130. On the other hand, when the distance between the target and the display part 130 is the third distance or less, the operation of the item set stops (S120). Items that make up the item set move constantly in accordance with the facial image as described above. When the target tries to operate it, the item operation is stopped so that the target can operate easily. When the items are moving, as illustrated in FIG. 8C, they are displayed as overlapping each other, but when the item operation is stopped into the operation state, as illustrated in FIG. 8E, the items may be displayed to reduce overlapping items. With this display, the items can be displayed more clearly and the target can select an item easily.

At this time, the image of the item closest to the target may be enlarged so that an explanation of the item may be displayed (S122). With this display, the target can select the item easily.

For example, as illustrated in the upper view of FIG. 8E, it is assumed that the man M puts his finger close to the display part 130. Then, the display processing part 260 stops the item movement. The position detecting part 212 detects the position of the finger of the man and displays the item 322c corresponding to the position 340 of the finger as enlarged. Then, as an explanation of the item 322c, a hook-line of a tune corresponding to the item 322c may be played back by the playback processing part 270. In this way, as the information about the item is provided to the target, the item selection can be facilitated.

Next, it is determined whether the target is in touch with the display part 130 (S124). Here, it is the operator 140 provided in front of the display part 130 that the target actually gets in touch with, however, in the following description it is assumed that the target is in touch with the display part 130 when touch with the operator 140 is detected. When it is determined at S124 that the target is out of touch with the display part 130, this processing is repeated. On the other hand, when it is determined that the target is in touch with the display part 130, the screen of the background layer 132 is changed and the detail information of the item with which the target is in touch is displayed (S126).

Figure 8F:
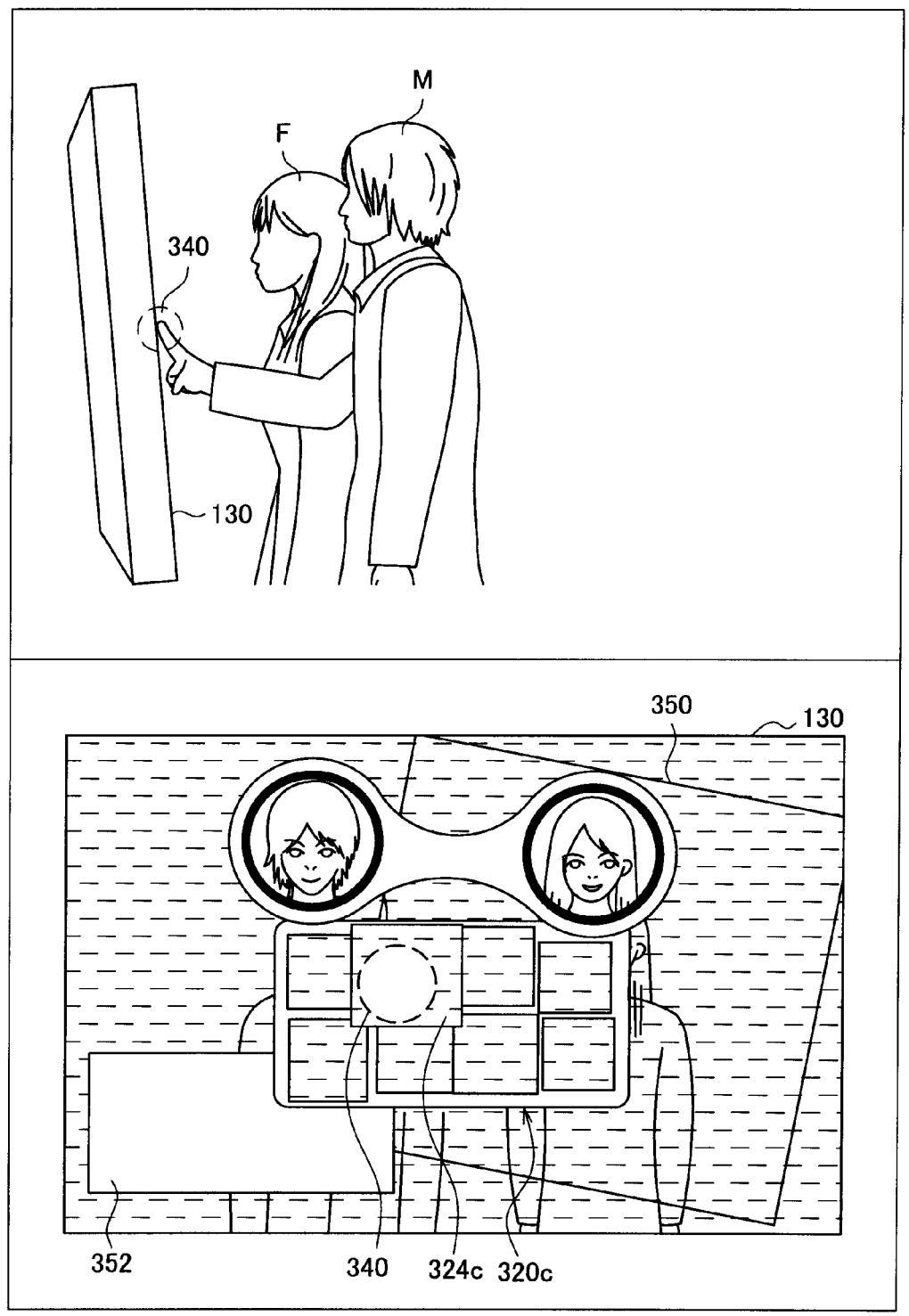
FIG. 8F is an explanatory view illustrating an example of processing of the content providing function according to the exemplary embodiment.

For example, as illustrated in the upper view of FIG. 8F, it is assumed that the man M has the finger get in touch with the display part 130. At this time, the display processing part 260 displays an enlarged image 350 of the item 324c corresponding to the position 340 where the man M is in touch on the item layer 138 and an explanation of the item 324c is displayed on the explanation area 352. Thus, the more detail information about the item can be provided to the target.

Further, it is determined whether the target gets out of touch with the display part 130 (S128). When this operation is seen in a series with the operation of S124, it is determined at S128 whether the target has clicked on the item displayed on the display part 130. When it is determined at S128 that the target continues to be in touch with the display part 130, the processing is repeated. On the other hand, it is determined at S128 that the target gets out of touch with the display part 130, the mode switching part 290 switches the processing mode from the operation mode 302 to the poster mode 304 (S130).

At S130, it is determined that one item is selected when the target is in touch with the display part 130 and gets out of touch with it. That is, switching from the operation mode 302 to the poster mode 304 is performed based on the operation of the target. When the processing mode is switched from the operation mode 302 to the poster mode 304, the display processing part 260 operates not to display the image of the background layer 132. Then, the playback processing part 270 plays the tune of the selected item from the beginning (S132).

Figure 8G:
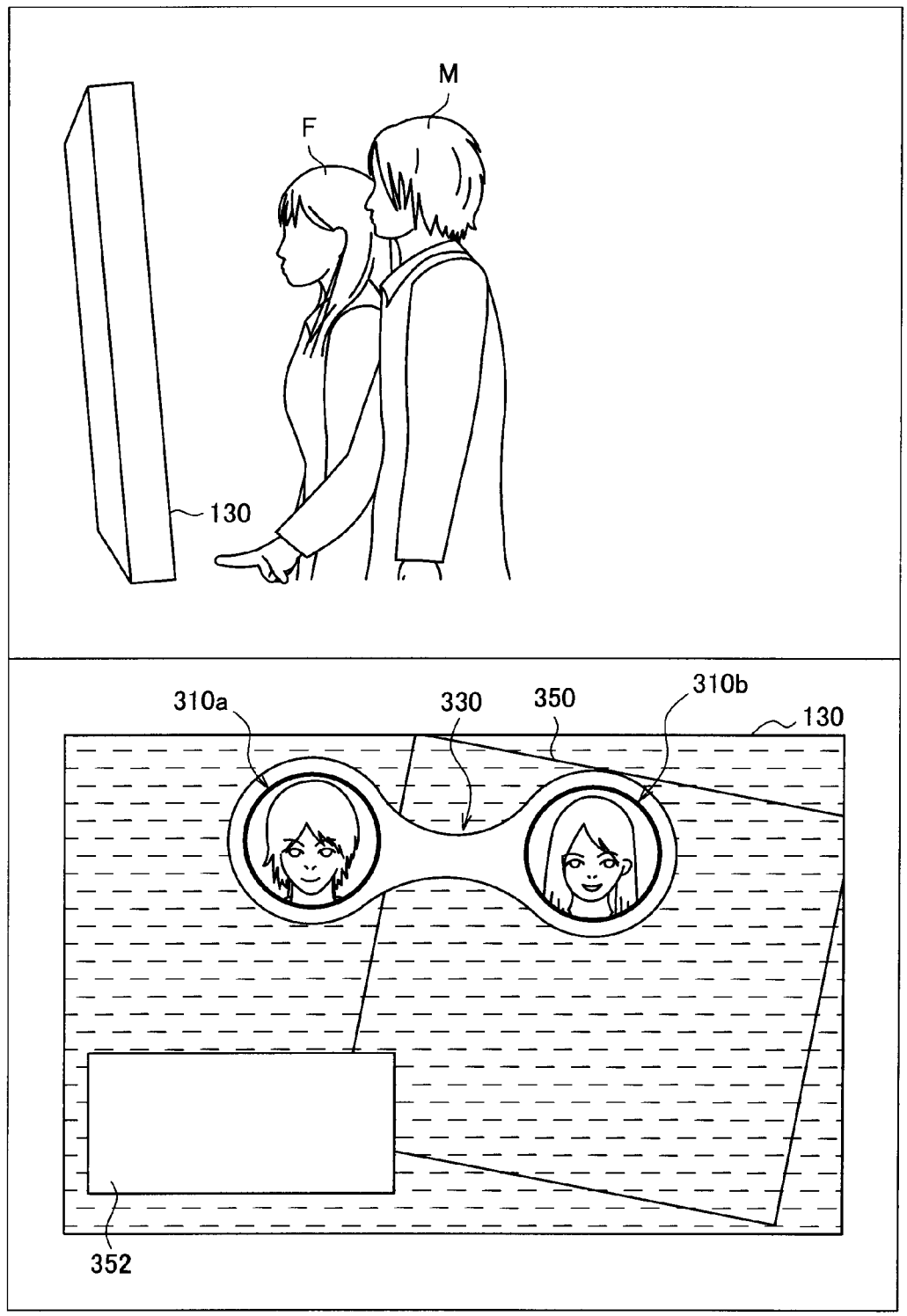
FIG. 8G is an explanatory view illustrating an example of processing of the content providing function according to the exemplary embodiment.

As described above, as the mode is switched from the operation mode 302 to the poster mode 304, for example, as illustrated in the lower view of FIG. 8G, the current image taken by the image pickup part 120 becomes not displayed. Then, on the display part 130, the facial images 310a and 310b of the person layer 135, the enlarged image 350 of the item of the item layer 138 and the explanation area 352 are displayed. Then, the tune of the selected item is played from the beginning.

Later, it is determined whether the termination conditions of the poster mode 304 are satisfied (S134). The termination conditions of the poster mode 304 are, for example, touch with the display part 130 by the target, completion of playback of the item tune, elapse of a predetermined time after transition to the poster mode 304, and the like. The termination conditions may be single or plural conditions. When the plural terminal conditions are set, for example, the poster mode 304 may be terminated on the condition that any one of the termination conditions is satisfied. This processing is repeated while the termination conditions of the poster mode 304 are satisfied. Then, when it is determined at S134 that the termination conditions of the poster mode 304 are satisfied, the mode is changed from the poster mode 304 to the operation mode 302 (S136).

Figure 8H:
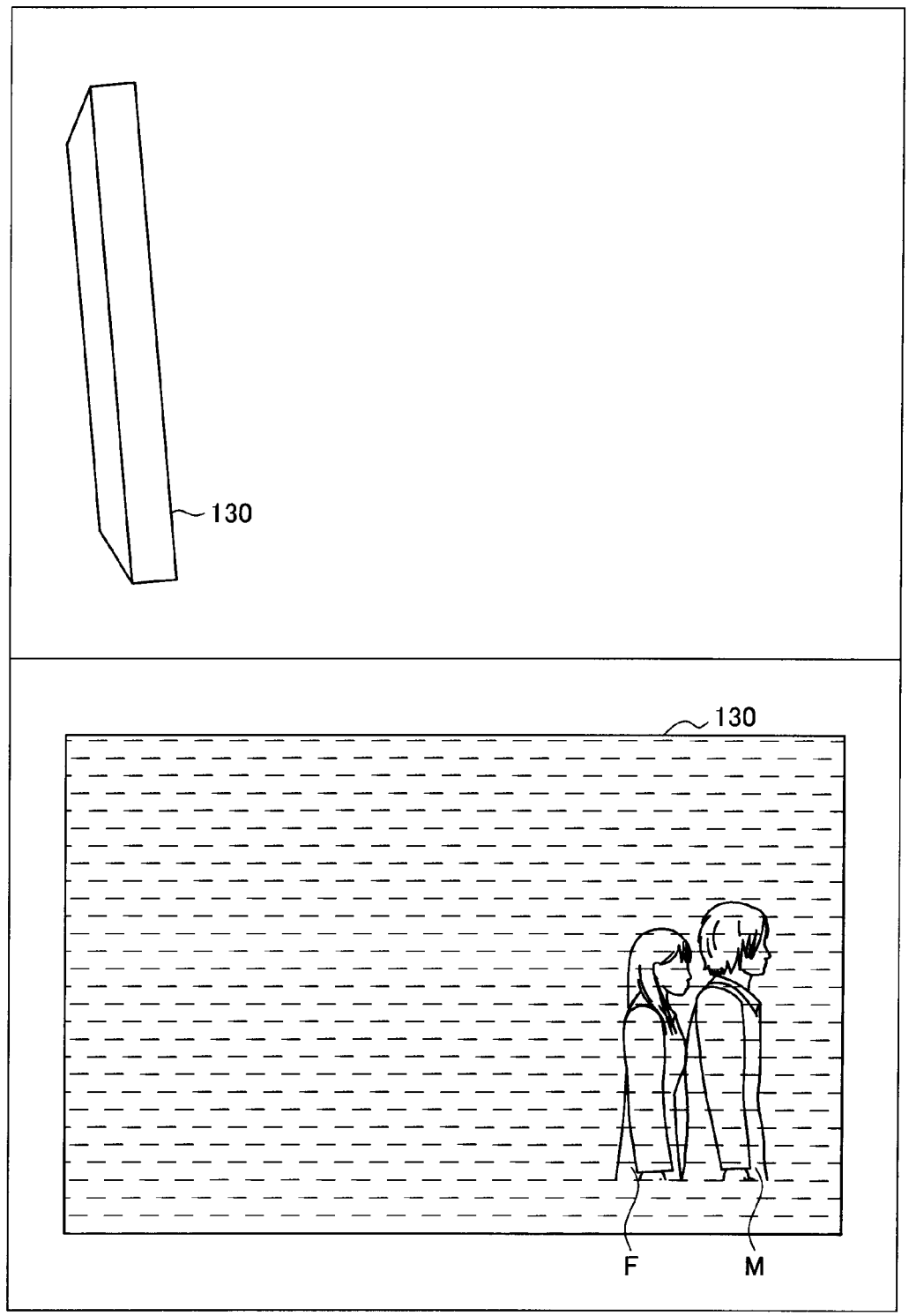
FIG. 8H is an explanatory view illustrating an example of processing of the content providing function according to the exemplary embodiment.

When the mode is switched to the operation mode 302 at S136, following processing can be determined in accordance with the distance between the display part 130 and the target. In other words, when the distance between the display part 130 and the target is the second distance or less, the procedure goes back to S114 for the following processing (S138). When the distance between the display part 130 and the target is the first distance or less, the procedure goes back to S110 for the following processing (S140). Then, it is determined at S140 that the distance between the target and the display part 130 is greater than the first distance, the procedure goes back to S102 and the image of the background layer 132 is only displayed until another person's face is detected. For example, as illustrated in FIG. 8H, when the target is away from the display part 130, the processing state becomes the same as that illustrated in FIG. 8A and the current image taken by the image pickup part 120 is only displayed on the display part 130.

[Effect by Content Providing Processing According to the Present Exemplary Embodiment]

As described above, the example of the content providing processing according to the present exemplary embodiment has been described. In the content providing processing according to the present exemplary embodiment, the facial information of a target obtained by the image pickup part 120 is used to group the target. Further, the position detecting part 212 obtains the positional relation between the display part 130 and the target. Then, the target attribute information, group information and positional information are used as a basis to provide contents to the target depending on the state and with good timing.

In other words, the attribute of the target can be understood well by grouping the target from the facial information of the target thereby to be able to provide the target with appropriate contents. Besides, regarding the positional relation between the display part 130 and the target, three states are recognized, that is, a first state where the target is sufficiently away from the display part 130, a third state where the target is close to the display part 130 so that the target can operate the operator 140 and a second state positioned between the first and third states. By recognizing these three states, the content display style is changed. The content display style includes a provided content itself, an amount of provided content information, a display manner of the information and the like.

In the first state where the distance between the display part 130 and the target is greater than the first distance, only the image taken by the image pickup part 120 or the facial image when a face is detected is displayed on the display part 130. When the distance between the display part 130 and the target becomes the first distance or less, the item set corresponding to the person attribute of the target is displayed on the display part 130. Then, when the distance between the display part 130 and the target is the second distance or less, the group attribute determining processing is performed and the item set corresponding to the group attribute is displayed on the display part 130. When the distance between the display part 130 and the target is the first distance or less and greater than the third distance, this is the second state, in which the content is displayed. Further, when the distance between the display part 130 and the target is the third distance or less, this is the third state, in which the items displayed as oscillating stop their movement and the display is changed so that the target can easily select an item.

In short, the three states are provided in accordance with the positional relation between the display part 130 and the target, that is, the first state for displaying the background image taken by the image pickup part 120 or the facial image of the target, the second state for displaying the item set to be provided to the target and the third state for the target to select an item. In this way, as contents are changed interactively in accordance with the distance between the target and the display part 130, the distance between the targets, facial expression and the like, it becomes possible to attract each target's interest.

Further, use of this content providing method enables to inform the target that the information processing apparatus 100 recognizes the target. Furthermore, as the image pickup part 120 is used to take an image of the target, an effect of gathering attention on the signage can be expected. In this way, it is possible to provide the target with contents effectively.

[Item Display Based on Smile Level]

In one example of content providing processing according to the present exemplary embodiment as described above, the item set is displayed or is not displayed depending on the distance between the target and the display part 130 as illustrated in FIGS. 8C and 8D. In such display of the item set, the number of items contained in the item set may be changed in consideration of yet other information.

For example, as illustrated in FIG. 9, a smile level of the target can be used. The item set 320 contains a plurality of items 322, 324, . . . . Incidentally, the display position of the item set 320 may be under the facial image of the target as in the case with the above-described example or above the facial image as illustrated in FIG. 9. When the image pickup part 120 detects the target face, the attribute obtaining part 240 obtains the smile level of the target as attribute information. Then, the content determining part 250 changes the number of items 322, 324, . . . contained in the item set 320 depending on the obtained smile level of the target.

For example, when a value indicating the smile level is small, the number of items 322, 324, . . . , of the item set 320 is reduced, while as the value of smile level becomes larger, the number of items 322, 324, . . . , of the item set 320 is increased. In this way, as the number of items 322, 324, . . . , to be displayed is changed depending on the smile level, it becomes possible to attract the target's interest more in the contents or apparatus.

[Extension of Content Providing Processing]

In the content providing processing by the image processing apparatus 100 according to the present exemplary embodiment, music is used as an item. However, this is not for limiting the invention and the content providing processing may be used for providing of any other items. For example, the items may be items to be recommended to individuals or groups such as fashion items, books, restaurants, amusement places, and the like. As, in the above-described example, the recommended item is determined based on the facial information obtainable from the face detecting part 232, this processing is not intended for limiting the invention. For example, as to target's dress, color histogram distribution or the like may be used to obtain a dress trend and recommended items may be determined based on the dress trend. Besides, the race information obtainable as the facial information may be used to recommend foreign music for foreigners preferentially.

Further, in the information processing apparatus 100 according to the present exemplary embodiment, it is possible to determine the attribute information of the target and group attribute information from the image take by the image pickup part 120 and to recognize the content selected by the target, with use of the operator 140. In view of this, as to attributes of persons and content types they desire to view or listen to, operation records may be accumulated and affect contents to be recommended for a target. Besides, by sending the operation records to a server via network, preference information of contents per attribute or group may be collected. As such information is obtained from the actually provided image pickup part 120 or display part 130, the information may be analyzed based on time, days or areas. Further, when the image taken by the image pickup part 120 is used to be able to recognize the face, the type of a person who does not get close the display part 130, a person who shows no interest may be analyzed.

It should be understood by those skilled in the art that various modifications, combinations, sub-combinations and alterations may occur depending on design requirements and other factors insofar as they are within the scope of the appended claims or the equivalents thereof.

For example, in the above-described exemplary embodiment, the group frame is displayed in such a manner that it includes the face frames of targets belonging to the same group; however, this is not for limiting the present invention. For example, the face frames of the targets belonging to the same group may be displayed as linked to each other by lines or the like. This enables to display the targets belonging to the same group more clearly.

For example, in the above-described exemplary embodiment, when the target gets in touch with the display part 130 at S126, the background screen is changed, and when the touch state is cancelled at S128, the music is played back from the beginning. However, this is not for limiting the present invention. For example, the music to be played or background screen may be changed when the target puts his/her hand over the display part 130.

The present application contains subject matter related to that disclosed in Japanese Priority Patent Application JP 2009-032027 filed in the Japan Patent Office on Feb. 13, 2009, the entire content of which is hereby incorporated by reference.

What is claimed is:

1. An information processing apparatus, comprising:
   an image pickup part which takes an image;
   a display part which displays the image;
   a position detecting part which detects a position of a target relative to the display part;
   a face detecting part which detects a face from the image taken by the image pickup part;
   an attribute obtaining part which obtains attribute information of the target based on a detection result detected by the face detecting part;
   a group determining part which determines a group to which the target belongs, at least based on the attribute information of the target detected by the face detecting part;
   a content determining part which determines one or more contents to be provided to the target based on at least one of group information indicating the group to which the target belongs and the attribute information of the target;
   a display processing part which displays content information of the content to be provided to the target, on the display part in a display style in accordance with the position of the target
   wherein when a distance between the target and the display part is a first distance or less, the display processing part displays an item set containing a plurality of pieces of the content information on the display part based on the attribute information of the target of which the face is recognized and when the distance between the target and the display part is a second distance or less and the second distance is less than the first distance, the group determining part determines the group of the target face-recognized, and the content determining part determines the content to be provided to the target based on the group information.

2. The information processing apparatus according to claim 1, wherein when the distance between the target and the display part is a third distance or less and the third distance is less than the second distance, the display processing part displays the content information on the display part in such a manner that the target can operate the content information.

3. The information processing apparatus according to claim 2, wherein
   when the distance between the target and the display part is the first distance or less and greater than the third distance, the display processing part displays the content information on the display part in such a manner that the content information is moving,
   when the distance between the target and the display part is the third distance or less, the display processing part displays the content information as stopped in movement.

4. The information processing apparatus according to claim 1, wherein the display processing part clips a facial image of the face detected by the face detecting part and displays the facial image on the display part.

5. The information processing apparatus according to claim 4, wherein the display processing part displays a face frame around the facial image and the face frame shows at leas one of the attribute information of the target and the group information.

6. The information processing apparatus according to claim 4, wherein the display processing part displays the clipped facial image as enlarged within an area between predetermined maximum size and minimum size of the facial image.

7. The information processing apparatus according to claim 4, wherein the display processing part displays the facial image at an upper part of the display part and the content information at a lower part of the display part.

8. The information processing apparatus according to claim 1, wherein the group determining part determines the group to which the target belongs, based on a gender and an age class of the target obtained from the attribute information of the target detected by the face detecting part and a number of targets detected when the target comprises a plurality of targets.

9. The information processing apparatus according to claim 8, wherein the group determining part determines the group to which the targets belong based on a distance between the targets detected by the position detecting part.

10. The information processing apparatus according to claim 1, further comprising:
    a mode switching part which switches between a first mode of presenting one or more pieces of content information and a second mode of presenting a content corresponding to one selected piece of the content information presented,
    the mode switching part determines an operation of the target from information of the position of the target detected by the position detecting part to switch from the first mode to the second mode,
    and the mode switching part switches from the second mode to the first mode based on preset termination conditions of the second mode.

11. An information processing method, comprising the steps of:
    taking an image;
    displaying the image on a display part;
    detecting a position of a target relative to the display part by a position detecting part;
    detecting a face from the image taken;
    obtaining attribute information of the target based on information of the face detected;
    determining a group to which the target belongs, at least based on the attribute information of the target face-detected;
    determining a content to be provided to the target based on at least one of group information indicating the group to which the target belongs and the attribute information of the target; and
    displaying content information of the content to be provided to the target, on the display part in a display style in accordance with the position of the target;

wherein when a distance between the target and the display part is a first distance or less, an item set containing a plurality of pieces of the content information on the display part based on the attribute information of the target of which the face is recognized is displayed and when the distance between the target and the display part is a second distance or less and the second distance is less than the first distance, the group of the target face-recognized is determined, and the content to be provided to the target based on the group information is determined.

* * * * *